(12) United States Patent
Basak et al.

(10) Patent No.: US 8,752,015 B2
(45) Date of Patent: Jun. 10, 2014

(54) METADATA MERGING IN AGENT CONFIGURATION FILES

(75) Inventors: Indranil Basak, West Linn, OR (US); Dipasoke Chattopadhyay, West Bengal (IN); Abhijit Bhadra, Andhra Pradesh (IN); Gurumurthy R, Tamil Nadu (IN)

(73) Assignee: CA, Inc., Islandia, NY (US)

( * ) Notice: Subject to any disclaimer, the term of this patent is extended or adjusted under 35 U.S.C. 154(b) by 238 days.

(21) Appl. No.: 13/310,986

(22) Filed: Dec. 5, 2011

(65) Prior Publication Data
US 2013/0145349 A1 Jun. 6, 2013

(51) Int. Cl.
G06F 9/44 (2006.01)
G06F 9/45 (2006.01)

(52) U.S. Cl.
USPC ............ 717/121; 717/120; 717/130; 717/154

(58) Field of Classification Search
None
See application file for complete search history.

(56) References Cited

U.S. PATENT DOCUMENTS

| | | | |
|---|---|---|---|
| 5,689,709 A | 11/1997 | Corbett et al. | |
| 6,470,494 B1 | 10/2002 | Chan et al. | |
| 6,985,909 B2 | 1/2006 | Blohm | |
| 7,017,155 B2 | 3/2006 | Peev et al. | |
| 7,058,957 B1 | 6/2006 | Nguyen | |
| 7,206,807 B2 | 4/2007 | Cheenath | |
| 7,293,260 B1 | 11/2007 | Dmitriev | |
| 7,398,533 B1 | 7/2008 | Slaughter et al. | |
| 7,437,359 B2 * | 10/2008 | Aguilar-Macias et al. | 1/1 |
| 7,469,262 B2 * | 12/2008 | Baskaran et al. | 1/1 |
| 7,483,927 B2 | 1/2009 | Anglin et al. | |
| 7,546,593 B2 | 6/2009 | Petev et al. | |
| 7,571,427 B2 | 8/2009 | Wang et al. | |
| 7,614,045 B2 | 11/2009 | Kuck et al. | |
| 7,870,431 B2 * | 1/2011 | Cirne et al. | 714/45 |
| 2002/0199172 A1 | 12/2002 | Bunnell | |
| 2003/0115584 A1 | 6/2003 | Fahs et al. | |
| 2003/0149960 A1 | 8/2003 | Inamdar | |
| 2003/0163608 A1 | 8/2003 | Tiwary et al. | |
| 2004/0078540 A1 * | 4/2004 | Cirne et al. | 711/170 |

(Continued)

FOREIGN PATENT DOCUMENTS

WO WO2009/095741 8/2009

OTHER PUBLICATIONS

Final Office Action dated May 15, 2013, U.S. Appl. No. 12/777,506 filed May 11, 2010.

(Continued)

*Primary Examiner* — Don Wong
*Assistant Examiner* — Marina Lee
(74) *Attorney, Agent, or Firm* — Vierra Magen Marcus LLP

(57) ABSTRACT

A technique for updating agent software which controls an agent, including how the agent adds instrumentation to an application and how the agent process data from the instrumentation. A current configuration file and an updated configuration file are evaluated in view of rules, to create a merged configuration file. The files include metadata entries. The rules can include: delete a current configuration file, not merge a current configuration file with an updated configuration file, overwrite a current configuration file with an updated configuration file, delete a metadata entry, prefer an entry in the configuration file over a corresponding entry in the updated configuration file, and prefer an entry in the updated configuration file over the corresponding entry in the configuration file. Customized entries in the current configuration file can be maintained if appropriate. Entries which are not maintained are kept in the merged configuration file as inline comments for documentation.

29 Claims, 14 Drawing Sheets

(56) References Cited

U.S. PATENT DOCUMENTS

| | | | |
|---|---|---|---|
| 2004/0078691 A1* | 4/2004 | Cirne et al. ............. | 714/38 |
| 2004/0133882 A1 | 7/2004 | Angel et al. | |
| 2004/0163077 A1 | 8/2004 | Dimpsey et al. | |
| 2004/0230956 A1 | 11/2004 | Cirne et al. | |
| 2005/0039172 A1 | 2/2005 | Rees et al. | |
| 2005/0240858 A1* | 10/2005 | Croft et al. ............. | 715/500 |
| 2005/0261879 A1 | 11/2005 | Shrivastava et al. | |
| 2005/0273667 A1 | 12/2005 | Shrivastava et al. | |
| 2005/0273787 A1 | 12/2005 | Kovachka-Dimitrova et al. | |
| 2006/0174226 A1 | 8/2006 | Fair et al. | |
| 2006/0218533 A1* | 9/2006 | Koduru et al. ............. | 717/124 |
| 2007/0150870 A1 | 6/2007 | Fitch et al. | |
| 2007/0168998 A1 | 7/2007 | Mehta et al. | |
| 2007/0234307 A1 | 10/2007 | Luk et al. | |
| 2007/0283331 A1 | 12/2007 | Pietrek | |
| 2008/0034352 A1 | 2/2008 | McKinney et al. | |
| 2008/0148242 A1 | 6/2008 | Cobb et al. | |
| 2008/0222614 A1 | 9/2008 | Chilimbi et al. | |
| 2008/0276227 A1* | 11/2008 | Greifeneder ............. | 717/130 |
| 2008/0288212 A1* | 11/2008 | Greifeneder ............. | 702/182 |
| 2008/0288962 A1 | 11/2008 | Greifeneder | |
| 2009/0013210 A1 | 1/2009 | McIntosh et al. | |
| 2009/0112667 A1 | 4/2009 | Blackwell et al. | |
| 2009/0144305 A1 | 6/2009 | Little | |
| 2009/0254889 A1 | 10/2009 | Prasadarao | |
| 2009/0282125 A1 | 11/2009 | Jeide et al. | |
| 2009/0320045 A1 | 12/2009 | Griffith et al. | |
| 2010/0131930 A1 | 5/2010 | Ben-Chaim et al. | |
| 2010/0257603 A1 | 10/2010 | Chander et al. | |
| 2011/0231819 A1* | 9/2011 | Tanner et al. ............. | 717/123 |
| 2013/0145349 A1* | 6/2013 | Basak et al. ............. | 717/121 |
| 2013/0179868 A1* | 7/2013 | Greifeneder et al. ....... | 717/130 |

OTHER PUBLICATIONS

Notice of Allowance and Fee(s) Due dated Jun. 25, 2013, U.S. Appl. No. 12/777,496, filed May 11, 2010.
Response to Search Opinion dated Sep. 5, 2012, European Patent Application No. 11250520.1-1225.
Response to Extended European Search Report dated May 16, 2012, European Patent Application No. 11250521.9.
U.S. Appl. No. 12/777,490, filed May 11, 2010.
U.S. Appl. No. 12/777,496, filed May 11, 2010.
U.S. Appl. No. 12/777,506, filed May 11, 2010.
Dmitriev, "Design of Jfluid: A Profiling Technology and Tool Based on Dynamic Bytecode Instrumentation," SMLI TR-2003-125, Nov. 17, 2003, Sun Microsystems, Inc., pp. 1-19.
Binder et al., "Advanced Java Bytecode Instrumentation," PPPJ 2007, Sep. 5-7, 2007, Lisboa, Portugal, Copyright 2007 ACM.
Extended European Search Report dated Aug. 16, 2011, European Patent Application No. 11250520.1-1225.
Morajko et al., "Design and implementation of a dynamic tuning environment," Journal of Parallel and Distributed Computing, vol. 67, No. 4, Mar. 24, 2007, pp. 474-490.
Extended European Search Report dated Sep. 1, 2011, European Patent Application No. 11250522.7-1225.
Extended European Search Report dated Sep. 19, 2011, European Patent Application No. 11250521.9-1225.
Response to the Search Opinion of the Extended European Search Report dated October 28, 2011, European Patent Application No. 11250522.7.
Non-Final Office Action dated Dec. 6, 2012, U.S. Appl. No. 12/777,490, filed May 11, 2010.
Non-Final Office Action dated Dec. 28, 2012, U.S. Appl. No. 12/777,496, filed May 11, 2010.
Non-Final Office Action dated Jan. 2, 2013, U.S. Appl. No. 12/777,506 filed May 11, 2010.
Mirgorodskiy, Alexander V., et al., "CrossWalk: A tool for performance profiling across the user-kernel boundary," Advances in Parallel Computing, vol. 13, 2004, pp. 745-752.
Response to Office Action dated Mar. 6, 2013, U.S. Appl. No. 12/777,490, filed May 11, 2010.
Notice of Allowance and Fee(s) Due dated Mar. 19, 2013, U.S. Appl. No. 12/777,490, filed May 11, 2010.
Response to Office Action dated Mar. 27, 2013, U.S. Appl. No. 12/777,496, filed May 11, 2010.
Response to Office Action dated Apr. 1, 2013, U.S. Appl. No. 12/777,506, filed May 11, 2010.

* cited by examiner

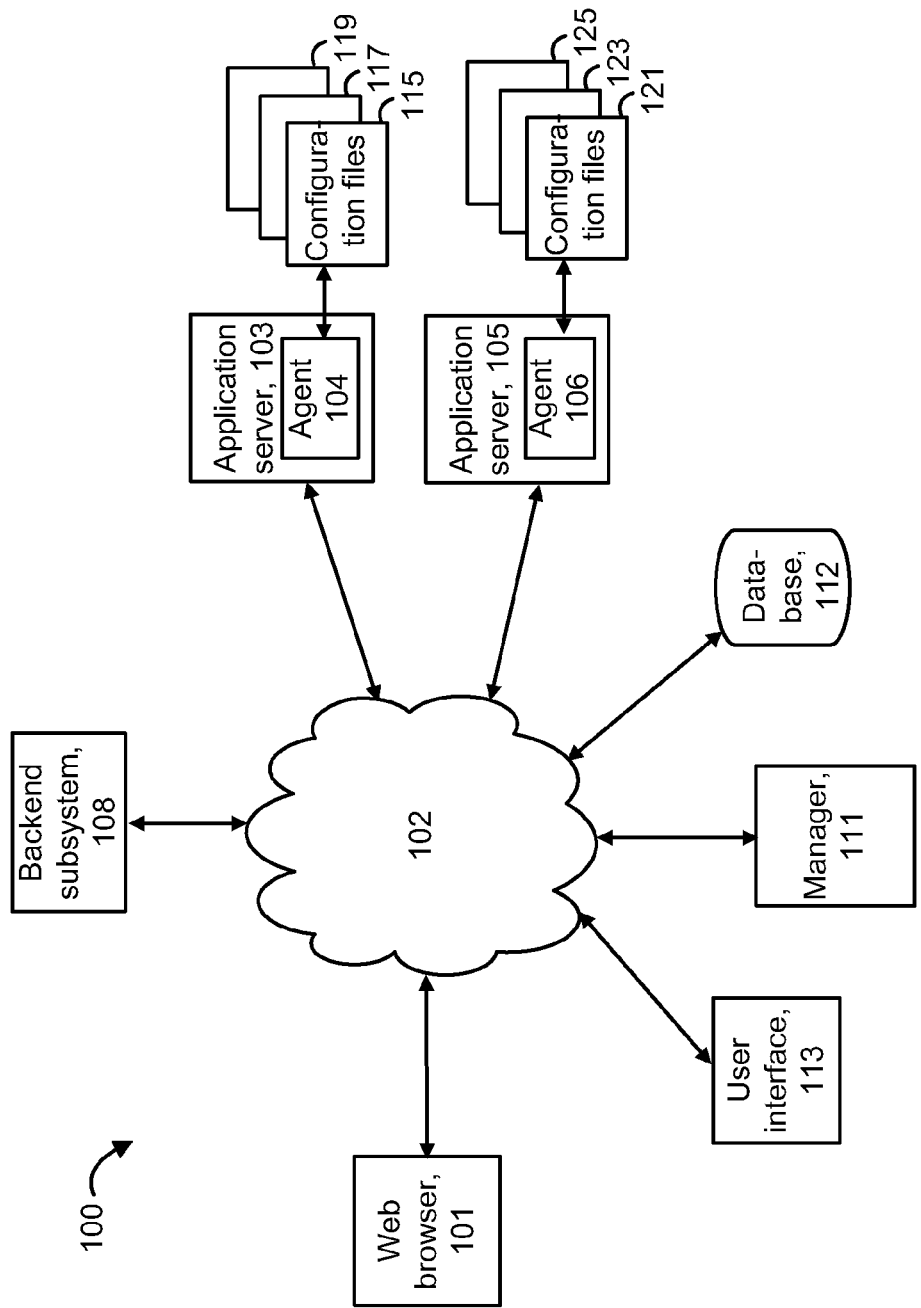

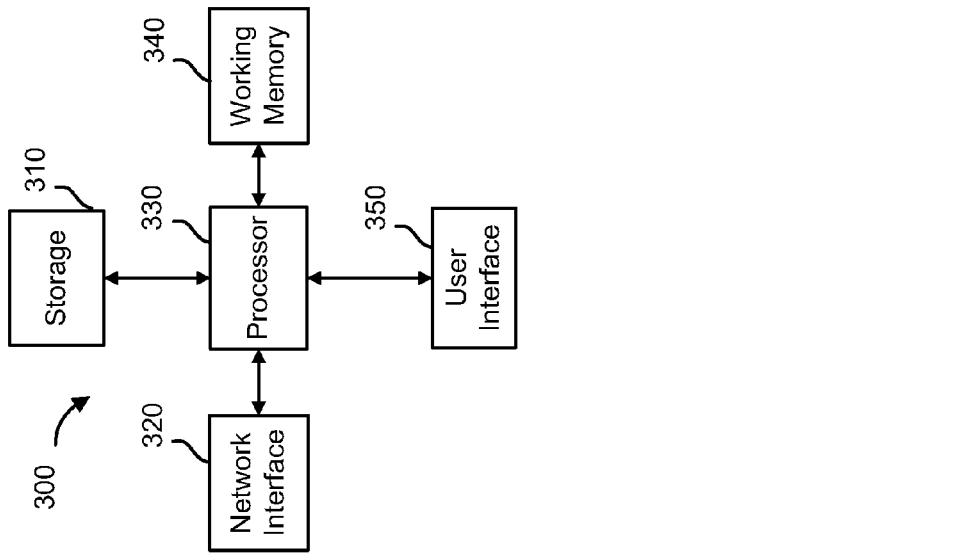
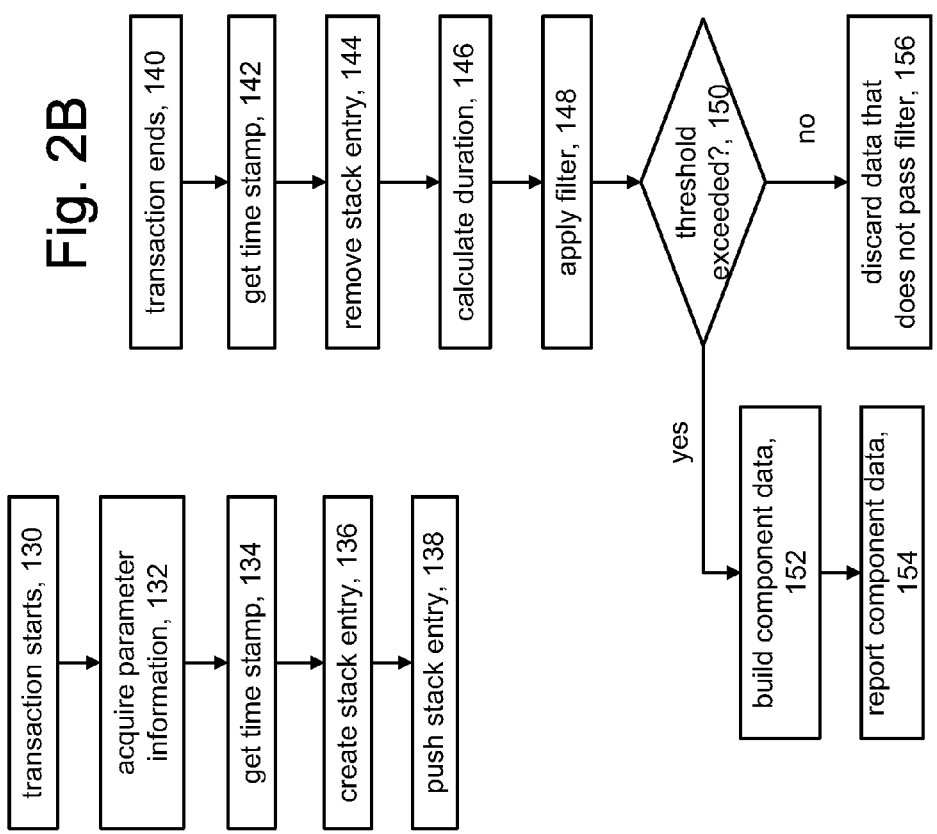

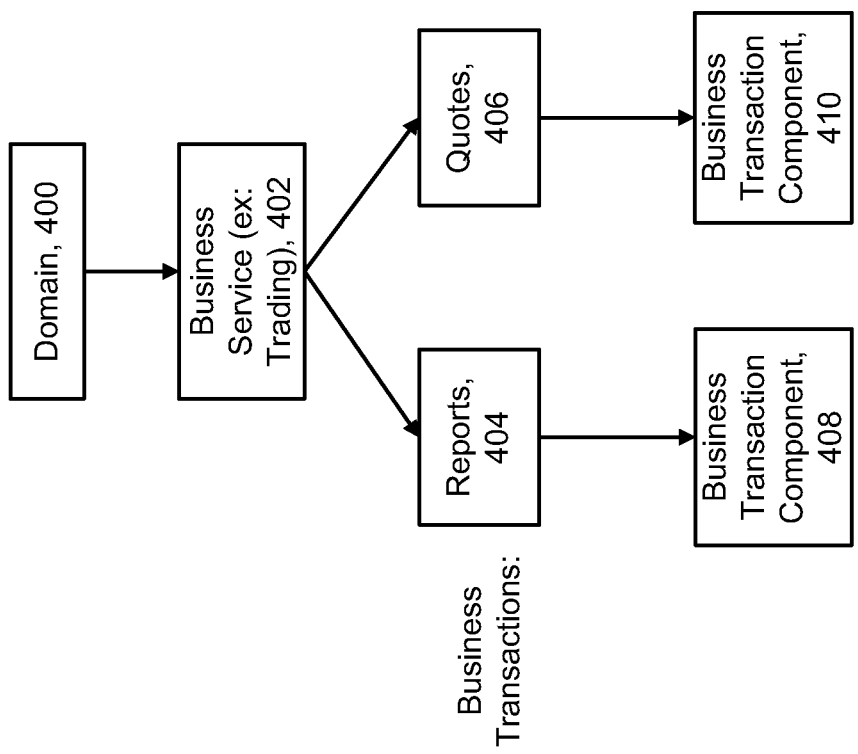

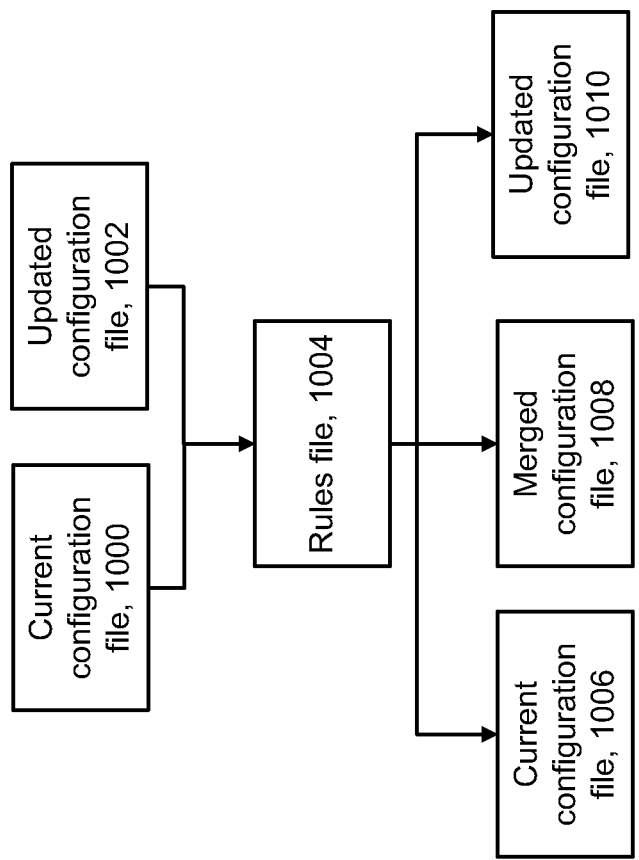

```
<?xml version="1.0" encoding="UTF-8"?>
<rules xmlns=""
    xmlns:xsi="http://www.w3.org/2001/XMLSchema-instance"
    xsi:noNamespaceSchemaLocation="MetadataMergeRules1.0.xsd">
    <delete-file type="pbd" name="SampleFile.pbd"/>
</rules>
```

Fig. 12A

```
<?xml version="1.0" encoding="UTF-8"?>
<rules xmlns=""
    xmlns:xsi="http://www.w3.org/2001/XMLSchema-instance"
    xsi:noNamespaceSchemaLocation="MetadataMergeRules1.0.xsd">
    <no-merge-file type="profile" name="SampleFile.profile"/>
</rules>
```

Fig. 12B

```
<?xml version="1.0" encoding="UTF-8"?>
<rules xmlns=""
    xmlns:xsi="http://www.w3.org/2001/XMLSchema-instance"
    xsi:noNamespaceSchemaLocation="MetadataMergeRules1.0.xsd">
    <overwrite-file type="pbl" name="SampleFile.pbl"/>
</rules>
```

Fig. 12C

```
<?xml version="1.0" encoding="UTF-8"?>
<rules xmlns=""
    xmlns:xsi="http://www.w3.org/2001/XMLSchema-instance"
    xsi:noNamespaceSchemaLocation="MetadataMergeRules1.0.xsd">
    <preferred-entry type="profile" preference="U" name="example.entry"/>
</rules>
```

Fig. 12D

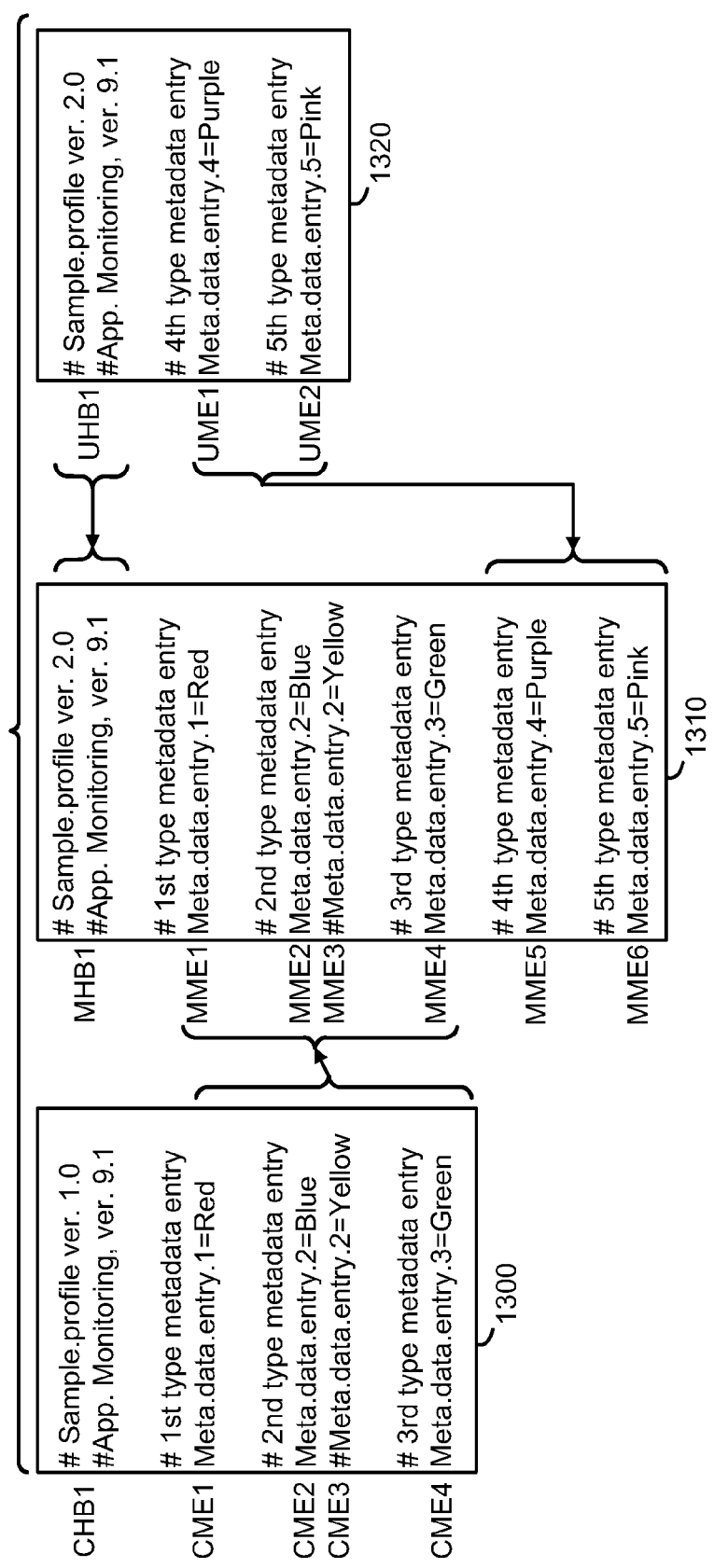

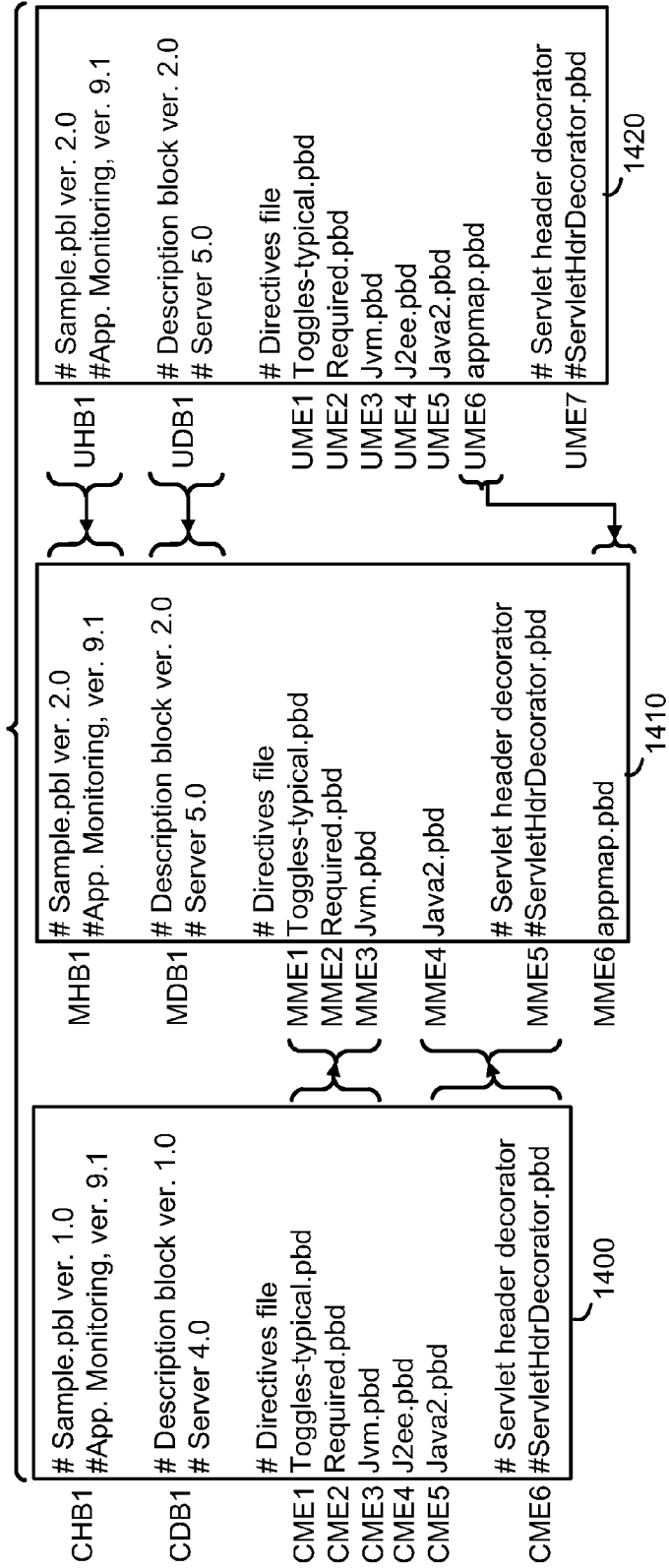

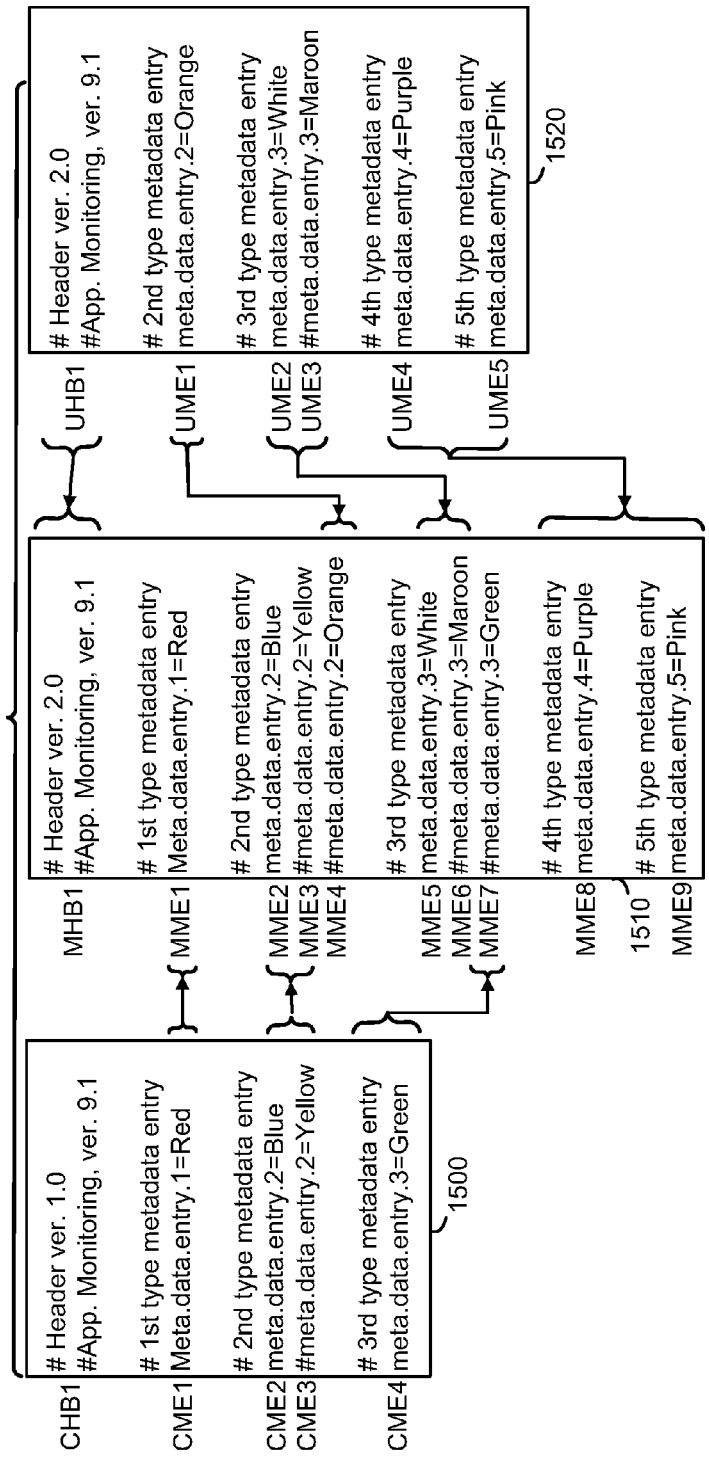

METADATA MERGING IN AGENT CONFIGURATION FILES

BACKGROUND OF THE INVENTION

1. Field of the Invention

Technology for monitoring software in a computing environment is provided.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed. One approach involves monitoring the infrastructure of the application by instrumenting the application and using the instrumentation to collect data regarding the individual software components that are invoked in the application. This approach can use agents that essentially live in the system being monitored. For example, using the instrumentation, a thread or process can be traced to identify each component that is invoked, as well as to obtain runtime data such as the execution time of each component.

The agent software is updated from time to time, such as to provide new features and fix bugs. However, the update process is made difficult due to custom settings in the agent software which are made by the network administrator. Preserving the custom settings while updating the agent software can require extensive, time consuming manual input.

SUMMARY OF THE INVENTION

The present invention provides a technique for updating agent software which controls a configuration of the agent, including how the agent adds instrumentation to an application and how the agent process data from the instrumentation.

In one embodiment, one or more tangible processor-readable storage devices having computer readable software embodied thereon are provided for programming at least one processor to perform a method for updating a current version of a configuration file which controls an agent which monitors an application. The method includes: creating a merged version of the configuration file based on the current version of the configuration file, an updated version of the configuration file, and rules, and using the merged version of the configuration file to control the agent. The creating the merged version of the configuration file comprises: identifying an entry in the current version of the configuration file for which there is a corresponding entry in the updated version of the configuration file; selecting one of: (a) the entry in the current version of the configuration file and (b) the corresponding entry in the updated version of the configuration file, as a selected entry, based on at least one preference in the rules; and based on the selecting, adding the selected entry to the merged version of the configuration file.

In another embodiment, one or more tangible processor-readable storage devices having computer readable software embodied thereon are provided for programming at least one processor to perform a method for updating a current version of a configuration file which controls an agent which monitors an application. The method includes: accessing rules, the rules indicate whether a current version of the configuration file should be at least one of: not merged and overwritten; if the rules indicate that the current version of the configuration file should be not merged, continuing to use the current version of the configuration file to control the agent without using the updated version of the configuration file to control the agent; if the rules indicate that the current version of the configuration file should be overwritten, using the updated version of the configuration file to control the agent and discontinuing using the current version of the configuration file to control the agent; and in response to determining that the rules do not indicate that the current version of the configuration file should be not merged, and that the rules do not indicate that the current version of the configuration file should be overwritten: creating a merged version of the configuration file based on the current version of the configuration file, the updated version of the configuration file, and the rules, and using the merged version of the configuration file to control the agent.

A corresponding processor-implemented method may be provided which performs computer-implemented steps as described above. A corresponding computer system may be provided which includes one or more tangible processor-readable storage devices having computer readable software embodied thereon, and at least one processor, where the at least one processor is responsive to the one or more tangible processor-readable storage devices to update a current version of a configuration file, as described above.

In another embodiment, a computer-implemented method is provided for updating a current version of a configuration file which controls an agent which monitors an application. The computer-implemented method includes: accessing the current version of the configuration file and an updated version of the configuration file; accessing rules in one or more files; creating and storing a merged version of the configuration file based on the current version of the configuration file, the updated version of the configuration file, and rules; and using the merged version of the configuration file to control behavior of the agent, including how the agent adds instrumentation to the application and a configuration of the agent The creating the merged version of the configuration file comprises: processing entries in the current version of the configuration file; and for each entry in the current version of the configuration file: determining whether there is a corresponding entry in the updated version of the configuration file, and if there is the corresponding entry, selecting one of: (a) the entry in the current version of the configuration file and (b) the corresponding entry in the updated version of the configuration file, as a selected entry, based on at least one preference in the rules, and based on the selecting, adding the selected entry to the merged version of the configuration file.

One or more tangible processor-readable storage devices having computer readable software embodied thereon can also be provided for programming at least one processor to perform the above-mentioned method. A corresponding computer system may be provided which includes one or more tangible processor-readable storage devices having computer readable software embodied thereon, and at least one processor, where the at least one processor is responsive to the one or more tangible processor-readable storage devices to update a current version of a configuration file, as described above.

BRIEF DESCRIPTION OF THE DRAWINGS

FIG. 1 depicts an example system in which multiple instances of an application run on different servers, and agents of the servers report to a manager.

FIG. 2A is a flowchart describing one embodiment of a process for starting the tracing of a transaction.

FIG. 2B is a flowchart describing one embodiment of a process for concluding the tracing of a transaction.

FIG. 3 depicts a computing device of the network of FIG. 1.

FIG. 4 depicts a hierarchy for use in describing the operation of one or more applications.

FIG. 10 depicts a process for applying rules to a current configuration file and an updated configuration file.

FIG. 12A depicts an example of a delete file rule of the rules file 1004 of FIG. 10.

FIG. 12B depicts an example of a no merge file rule of the rules file 1004 of FIG. 10.

FIG. 12C depicts an example of an overwrite file rule of the rules file 1004 of FIG. 10.

FIG. 12D depicts an example of a preferred entry rule of the rules file 1004 of FIG. 10.

FIG. 13 depicts an example of a no-conflict merge scenario according to the process of FIG. 10.

FIG. 14A depicts an example of a delete entry rule of the rules file 1004 of FIG. 10.

FIG. 14B depicts an example of a merge with deletion scenario according to the process of FIG. 10 and the delete entry rule of FIG. 14A.

FIG. 15A depicts an example of preferred entry rule of the rules file 1004 of FIG. 10.

FIG. 15B depicts an example of a merge with conflict scenario according to the process of FIG. 10 and the preferred entry rule of FIG. 15A.

DETAILED DESCRIPTION

Figure 5:
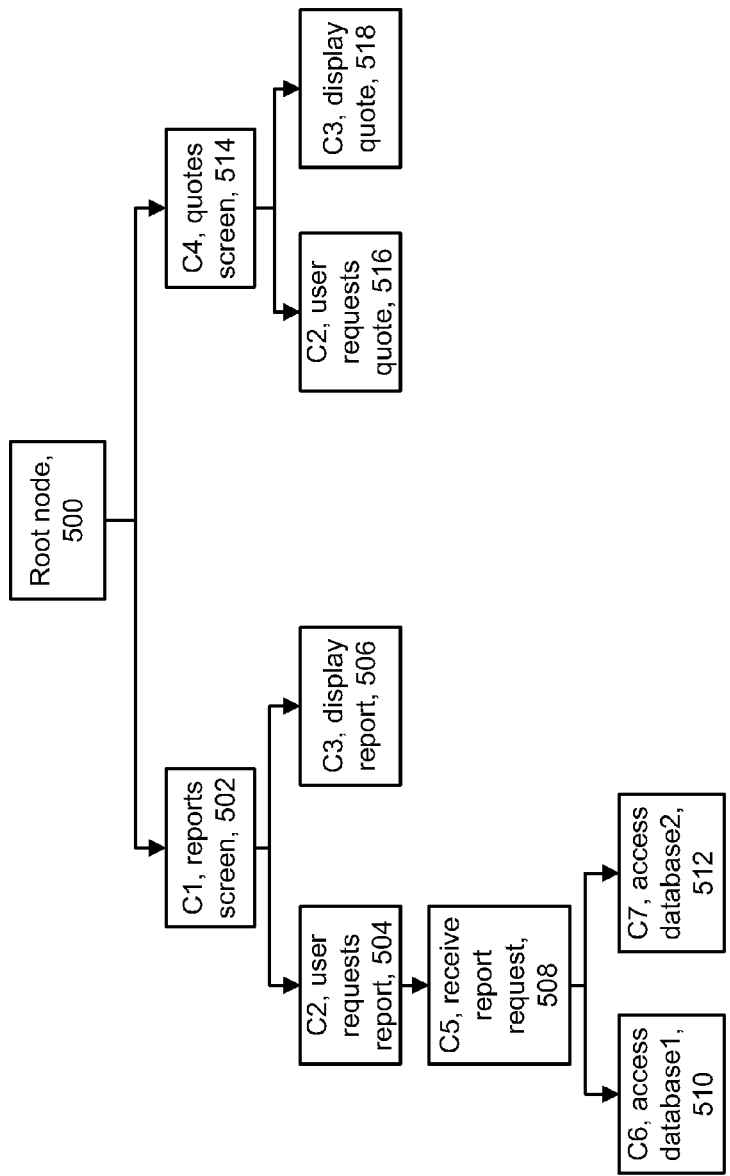
FIG. 5 depicts dependency relationships in an example sequence of components invoked in the Reports and Quotes Business Transactions of FIG. 4.

The present invention provides a technique for merging metadata of agent software. The metadata is typically provided in one or more configuration files which control a configuration of the agent, including how the agent adds instrumentation to an application and how the agent process data from the instrumentation. The technique evaluates a current configuration file and an updated configuration file in view of rules. The files include metadata entries which relate to specific features/actions of the agent. The rules can include: delete a current configuration file, not merge a current configuration file with an updated configuration file, overwrite a current configuration file with an updated configuration file, delete a metadata entry, prefer an entry in the configuration file over a corresponding entry in the updated configuration file, and prefer an entry in the updated configuration file over the corresponding entry in the configuration file. Based on the rules, a merged configuration file is created. The process allows customized entries in the current configuration file to be maintained if appropriate. Entries which are not maintained can be kept in the merged configuration file as inline comments for documentation or later activation.

FIG. 1 depicts an example system 100 in which multiple instances of an application run on different servers, and agents of the servers report to a manager. Example managed computing devices 103 and 105 may include application servers or any other type of computing device having one or more processors for executing code to achieve a desired functionality. The managed computing devices can be located remotely from one another or co-located. The managed computing devices communicate with a manager computer 111 via a network 102. The network 102 can include, e.g., the Internet, one or more wide area networks, and/or one or more local area networks. The manager computer 111 can be local to, or remote from, the managed computing devices. The managed computing devices 103 and 105 also communicate with client computing devices such as an example web browser 101 via the network 102. The web browser 101 may access the network 102 via an Internet Service Provider, for instance. The managed computing devices can also call a backend system 108 such as a mainframe, database or some other uninstrumented computing device, to obtain information which is needed to respond to a request from the web browser. This call can use a Web Services call or Enterprise Java Bean (EJB) Client, for instance. The managed computing devices are considered to be front end subsystems from which a full range of performance metrics can be obtained. In contrast, limited information may be obtained regarding an uninstrumented subsystem such as the backend subsystem 108.

For example, a corporation running an enterprise application such as a web-based e-commerce application may employ a number of application servers at one location for load balancing. Requests from users, such as from the example web browser 101, are received via the network 102, and can be routed to any of the managed computing devices. Agent software running on the managed computing devices 103 and 105, denoted by agent 104 and agent 106, respectively, gather information from an application, middleware or other software, running on the respective managed computing devices. Such information may be obtained using instrumentation, one example of which is byte code instrumentation. However, the gathered data may be obtained in other ways as well. The agents essentially live in the computing device being monitored and provide a data acquisition point. The agents organize and optimize the data communicated to the manager 111. In one implementation, different instances of the same application run at the managed computing devices.

The manager 111 can be provided on a separate computing device such as a workstation which communicates with a user interface 113 (see also FIG. 9), such as a monitor, to display information based on data received from the agents. The manager can also access a database 112 to store the data received from the agents. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 111 and user interface display 113 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, tracing may be used to track the execution of software. One example of tracing is discussed in U.S. Pat. No. 7,870,431, issued Jan. 11, 2011, titled "Transaction Tracer," and incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application, and a computing device on which the application runs is referred to as a managed computing device. The agent software receives information from the probes and may communicate the information to another process, such as at the manager 111, or process the information locally, such as to determine whether the information indicates an abnormal condition. The agent thus collects and summarizes information received from the probes. The probes collect information as defined by a directives file. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents are typically aware of the software executing on the local managed computing device with which they are associated.

The probes can report a standard set of metrics which include: CORBA method timers, Remote Method Invocation (RMI) method timers, Thread counters, Network bandwidth, JDBC update and query timers, Servlet timers, Java Server Pages (JSP) timers, System logs, File system input and output bandwidth meters, Available and used memory and EJB (Enterprise JavaBean) timers. A metric is a measurement of a specific application activity. Each of these metrics can be configured by agent metadata.

An agent reports information about transactions, which identifies resources which are accessed by an application. In one approach, when reporting about transactions, the word Called designates a resource. This resource is a resource (or a sub-resource) of a parent component, which is a consumer. For example, assume that Servlet A is the first component invoked in a transaction. Under the consumer Servlet A (see below), there may be a sub-resource Called EJB. Consumers and resources can be reported by the agent in a tree-like manner. Data for a transaction can also be stored according to the tree. For example, if a Servlet (e.g., Servlet A) is a consumer of a network socket (e.g., Socket C) and is also a consumer of an EJB (e.g. EJB B), which in turn is a consumer of a JDBC (e.g., JDBC D), the tree might look something like the following:

Servlet A
      Data for Servlet A
      Called EJB B
        Data for EJB B

-continued

Called JDBC D
          Data for JDBC D
      Called Socket C
        Data for Socket C In one embodiment, the above tree is stored by the agent in a stack, called the Blame Stack. When transactions are started, they are pushed onto the stack. When transactions are completed, they are popped off the stack. In one embodiment, each transaction on the stack has the following information stored: type of transaction, a name used by the system for that transaction, a hash map or dictionary of parameters, a timestamp for when the transaction was pushed onto the stack, and sub-elements. Sub-elements are Blame Stack entries for other components (e.g., methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. An example of an entry point to a transaction/branch is a URL. As the tree above notes, EJB B is a sub-element of Servlet A and also has its own entry. The top (or initial) entry (e.g., Servlet A) for a transaction, is called the root component. Each of the entries on the stack is an object.

Each agent adds instrumentation to an application and is configured based on one or more configuration files. For example, agent 104 may use configuration files 115, 117 and 119, and agent 106 may use configuration files 121, 123 and 125. The configuration files can include an agent profile file, a probe builder directives file and a probe builder list file, for instance (e.g., files 115, 117 and 119, respectively, or 121, 123 and 125, respectively). One or more of each type of file may be used. See also FIG. 10.

A) Agent Profile File

The agent profile files are responsible for enabling/disabling of agent features, location of server, type of communication (e.g., plain socket, SSL, HTTP, HTTP over SSL), location of configuration files and log files, metric sending frequency, and so forth. An example file location is: apm.agent.changeDetector.profile=../common/change-detector.xml. As another example, consider a feature referred to as "Application Map," which is a directed graph or map that aggregates transactions and displays interactions between subsystems. This feature (referred to as feature 1) could be enable by the following example code:
Enable/disable Application Map feature
apm.agent.feature1.enabled=true If an entry in the current version of the configuration file sets the feature to true, and the corresponding entry in the updated version of the configuration file sets the feature to false, the entries define a conflicting enabled/disabled status of a feature of the agent.

Consider different types of communication which an agent can use, such as to report data obtained from instrumentation of an application to a manager. A specified protocol and host information can be used. For example, a TCP (Transmission Control Protocol) and a default host (localhost) can be specified by the following example code:
Enterprise Manager Locations type of communication
apm.agent.manager.transport.tcp.host=localhost A default port # (5001) can be specified by the following example code:

apm.agent.manager.transport.tcp.port=5001

A default socket (apm.net.StandardSocketFactory) can be specified by the following example code:

apm.agent.manager.transport.tcp.socketfactory=apm.net.StandardSocketFactory.

If an entry in the current version of the configuration file defines a default port of 5001, and the corresponding entry in the updated version of the configuration file defines a default port of 5000, the entries define conflicting types of communication used by the agent.

An example of a location of a log file can be specified by the following code:
Location of log file
apm.agent.logfile=../logs/Agent.log If the entry in the current version of the configuration file sets one location of a log file, and the corresponding entry in the updated version of the configuration file sets another, different location of the log file, the entries define conflicting locations of a log file of the agent.

B) Probe Builder Directives File

A probe builder directives file contains directives for the agent. Directives may contain information about the type and source of metrics to generate, e.g., by specifying at least one method of a class or set of classes to monitor and a type of information to be collected in the application, or information about a formatter for renaming a metric, and so forth. Directives can also specify at least one method of a class or set of classes to instrument. Directives are relevant for configuration files of type PBD, for instance. The following is an example of a custom tracer used for generating a metric:

Specify Custom Tracer Mapping—responsible for generating the metric
SetTracerClassMapping:ExampleTracer     apm.agent.example.trace.ExampleTracer
apm.probebuilder.validate.MetricNameValidator
    #Set optional Tracer Parameters
SetTracerParameter: ExampleTracer reentrancy instance
SetTracerParameter: ExampleTracer useblame true
    #Set Tracer Group—primarily responsible for turning on/off tracers
SetFlag: ExampleTracerGroup
TurnOn: ExampleTracerGroup
    #Link a Tracer Group with a particular resource (class)
IdentifyClassAs: basaki.CustomFrontend ExampleTracerGroup
    #Set up Custom Tracer directive
TraceOneMethodIfFlagged: ExampleTracerGroup enter ExampleTracer "Agent Example Extension|Tracer| {classname}:Method Execution Time (ms)".

If an entry in the current version of a configuration file provides one directive (e.g., instrument a method A in class A) and the corresponding entry in the updated version of the configuration file provides another, conflicting directive (e.g., do not instrument the method A in the class A), the entries define conflicting directives regarding at least one method of a class or set of classes to monitor and a type of information to be collected in the application.

Another example of conflicting probe builder directives is when one file has an entry meta.data.entry.2=Blue and another file has the entry meta.data.entry.2=Orange.

C) Probe Builder Listing file

A PBL (Probe Builder Listing) configuration file is used for grouping a set of PBD files. For example:
    # List Title
Title: Example Application Server
    # List Description Description: Default PBL for Example Application Server
    # Directives Files
    # One directives file name per line. Relative names
    # are resolved against the location of this file.
toggles-typical.pbd
required.pbd
jvm.pbd
j2ee.pbd
java2.pbd
struts.pbd
taglibs.pbd
oraclejdbc.pbd
sqlagent.pbd The applications of the servers 103 and 106 can execute in an execution environment such as the JAVA runtime environment, as discussed in connection with FIG. 7. The JAVA runtime environment uses a Java Virtual Machine (JVM). Programs intended to run on a JVM are typically compiled into a standardized portable binary format, which usually are in the form of .class files. A program may include many classes in different files. For easier distribution of large programs, multiple class files may be packaged together in a (JAVA Archive) JAR file. The JVM runtime executes class or JAR files, emulating the JVM instruction set by interpreting it, or using a just-in-time compiler (JIT). JIT compiling, as opposed to interpreting, is often used in a JVM to achieve greater speed.

FIG. 2A is a flowchart describing one embodiment of a process for starting the tracing of a transaction. The steps are performed by the appropriate agent(s). In step 130, a transaction starts. In one embodiment, a transaction starts a class-method pair in the application. The instrumented code in that method calls a method (e.g., "loadTracer") of the Agent. In step 132, the agent acquires the desired parameter information. In one embodiment, a user can configure which parameter information is to be acquired via a configuration file or a UI. The acquired parameters are stored in a hash map or dictionary, which is part of the object pushed onto the Blame Stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
|---|---|---|
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |

| Parameters | Appears in | Value |
| --- | --- | --- |
| Object | All non-static methods | toString( ) of the this object of the traced component, truncated to some upper limit of characters. |
| Class Name | All | Fully qualified name of the class of the traced component. |
| Param_n | All objects with WithParams custom tracers | toString( ) of the nth parameter passed to the traced method of the component. |
| Primary Key | Entity Beans | toString( ) of the entity bean's property key, truncated to some upper limit of characters. |

Parameters can include query, cookie, post, URL and session type name/value pairs.

In step 134, the system acquires a timestamp indicating the current time. In step 136, a stack entry is created. In step 138, the stack entry is pushed onto the Blame Stack. In one embodiment, the timestamp is added as part of step 138. The process is performed when a transaction is started. A similar process is performed when a sub-component of the transaction starts (e.g., EJB B is a sub-component of Servlet A—see tree described above).

FIG. 2B is a flowchart describing one embodiment of a process for concluding the tracing of a transaction. The process is performed by an agent when a transaction ends. In step 140, the process is triggered by a transaction (e.g., method) ending (e.g., calling of a method in the agent such as "finishTrace"). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, would include determining whether the calculated duration from step 146 is greater than one second. If the threshold is not exceeded (step 150), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the agent to other components in the system of FIG. 1. If the duration exceeds the threshold (step 150), then the agent builds component data in step 160. Component data is the data about a transaction that will be reported. In one embodiment, the component data includes the name of the transaction, the type of the transaction, the start time of the transaction, the duration of the transaction, a hash map or dictionary of the parameters, and all of the sub-elements (which can be a recursive list of elements). Other information can also be part of the component data. In step 162, the agent reports the component data by sending the component data via the TCP/IP protocol to the manager 111.

FIG. 2B represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

FIG. 3 depicts a computing device of the network of FIG. 1. The computing device 300 is a simplified representation of a system which might be used as one of the web browsers, application server, managers, databases, backend subsystems and/or user interfaces, such as discussed in connection with FIG. 1. The computing device 300 includes a storage device 310 such as a hard disk or portable media, a network interface 320 for communicating with other computing devices, a processor 330 for executing software instructions, a working memory 340 such as RAM for storing the software instructions after they are loaded from the storage device 310, for instance, and a user interface display 350 such as one or more video monitors. A user interface can be provided one or more monitors. The storage device 310 may be considered to be a tangible, non-transitory processor- or computer-readable storage device having processor readable code embodied thereon for programming the processor 330 to perform methods for providing the functionality discussed herein. The user interface display 350 can provide information to a human operator based on the data received from one or more agents. The user interface display 350 can use any known display scheme, whether graphical, tabular or the like (see FIG. 9). In addition to an on-screen display, an output such as a hard copy such from a printer can be provided.

A database may be included in the storage device 310 when the storage device 310 is part of a computing device 300 such as an application server, manager and/or user interfaces. The storage device 310 can represent one or more storage devices which store data received from one or more agents, and which can be accessed to obtain data to provide a user interface as described herein. The storage device 310 can represent a data store.

Further, the functionality described herein may be implemented using hardware, software or a combination of both hardware and software. For software, one or more non-transitory, tangible processor readable storage devices having processor readable code embodied thereon for programming one or more processors may be used. The non-transitory, tangible processor readable storage devices can include computer readable media such as volatile and nonvolatile media, removable and non-removable media. For example, non-transitory, tangible computer readable media may include volatile and nonvolatile, removable and non-removable media implemented in any method or technology for storage of information such as computer readable instructions, data structures, program modules or other data. Examples of non-transitory, tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

FIG. 4 depicts a hierarchy for use in describing the operation of one or more applications. The different levels of the hierarchy can be defined based on any desired organizational structure. For example, the hierarchy can include human-facing terminology, that is, terminology which facilitates understanding of client's interactions with a monitored application. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The hierarchy can be considered to be an abstract construct which provides a way to organize information about how an application executes in a manner which is more understandable to the human operator.

A top level of the hierarchy is a domain level 400 named "Domain." A next level of the hierarchy is a Business Service level 402. An example of a Business Service relates to trading a stock using a web site. Thus, "Trading" can be the name of a node at the Business Service level of the hierarchy. A next level of the hierarchy is a Business Transaction level. A Business Service can be made up of a number of Business Transactions. For example, for Trading, the Business Transactions can include Reports 404 (e.g., view a report regarding a stock or an account) and Quotes 406 (e.g., obtain a quote for a stock price). Further, a Business Transaction can be associated with one or more Business Transaction Components. In one approach, a Business Transaction has only one identifying component. A Business Transaction Component can be a type of component of an application which is recognizable and measurable by a server, such as a servlet or EJB. In one approach, one of the components of an application is set as a Business Transaction Component, which is an identifying transaction component for a Business Transaction.

The Business Transaction Component is the identifying transaction component for the transaction that is the identifying transaction for the Business Transaction. A transaction can represent a sequence of software components which are invoked in response to a request from a client, to provide a corresponding response to the client. For example, a Business Transaction Component can be identified by determining when component data reported by an agent match a set of rules. This definition can include, e.g., a specified URL host name, URL parameters, HTTP post parameters, cookie and/or session manager parameters. Additionally, or alternatively, the definition may require a transaction to start with a specified URL host name. The agent or manager, for instance, can compare the component data against the set of rules to determine when a Business Transaction Component is present in a Business Transaction. If a Business Transaction Component is detected, then the associated Business Transaction is of a specified type. For example, if the Business Transaction Component 408 is detected, then the associated Business Transaction is Reports 404. If the Business Transaction Component 410 is detected, then the associated Business Transaction is Quotes 406.

FIG. 5 depicts dependency relationships in an example sequence of components invoked in the Reports and Quotes Business Transactions of FIG. 4. The components are depicted as blocks in a flow path. The same component can appear more than once.

Component-oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. One example of a component oriented programming model is J2EE, which can employ components such as a Java Server Page, an EJB, a servlet, and a Java Database Connectivity (JDBC) component. JDBC is an Application Programming Interface (API) for the JAVA™ programming language that defines how a client may access a database. It provides methods for querying and updating data in a database. However, other component oriented programming models such as the MICROSOFT CORP. ".NET" Framework may also be used. Moreover, the programming model need not be object oriented.

This example provides details of the Reports and Quotes Business Transactions discussed previously. In one possible implementation, each component of a Business Transaction includes one or more class-method pairs. For example, a servlet is a JAVA class. It is an object that receives a request and generates a corresponding response. A class-method pair can be represented by the notation class.method. For example, Reports could include a component C1 (502) which displays a reports screen on a user interface (UI) to receive a user's input regarding a desired report. An example format of a class-method pair for C1 is ServletA1. DisplayReport Screen. C1 is under a root 500. Thus, whenever an agent detects that C1 has been invoked, it concludes that the current transaction is part of Reports, and associates its component data with Reports.

C1 can call C2 (504) which relates to a requested report. C2 could include a class-method pair such as ServletA2.RequestedReport which processes a user input of a requested report. This processing could include checking the format of the request, for instance, and, if the format is valid, making a call to a component C5 (508), which receives the report request. For instance, this call may be a cross-process, cross-thread transaction or cross-subsystem call. If the format is invalid, the control flow returns to C1, which may call C3 to display an error message, for instance.

An example format of a class-method pair for C5 is ServletA3.ReceiveReportRequest. C5 can call C6 (510) to access a database1 and/or C7 (512) to access a database2, such as based on the type of the report request. For example, C6 and C7 can each include a JDBC driver call which invokes one or more SQL statements. The control flow then returns to C5, then to C2 and then to C1. Subsequently, C1 calls C3 (506) which relates to providing a display, such as a display of the requested report based on data retrieved from the databases. The control flow then returns to C1.

Also, under the root 500, a component C4 (514) can be provided which displays a quotes screen on a user interface (UI) to receive a user's input regarding a desired quote. C1 can call C2 (504) which relates to a requested report. C2 can process the user input by checking the format of the request, for instance, and if the format is valid, obtaining the requested quote, such as from a data source which is local to subsystem1. If the format is invalid, the control flow returns to C4, which may call C3 to display an error message, for instance. The control flow then returns to C4. C4 can call C3 (518), which relates to providing a display, such as a display of the requested quote based on the data retrieved from the data source.

Note that a component can continue executing after calling another component, which begins executing, in an asynchronous, multi-thread or multi-process mode. Or, a component can temporarily pause until the called component has finished executing, in a synchronous, single-thread or single-process mode. A component which is pausing can be considered to be in a wait interval, while a component which is executing can be considered to be in an active, executing mode. Also, a component may be invoked more than once during a transaction.

Figure 6:
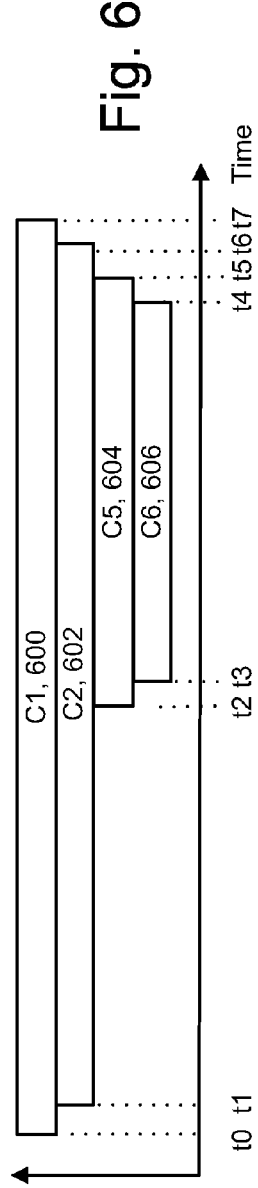
FIG. 6 depicts a transaction trace for a sequence of invoked components in the transactions of FIG. 5.

FIG. 6 depicts a transaction trace for a sequence of invoked components in the transactions of FIG. 5. The horizontal direction represents time, while the vertical direction indicates call stack depth or position. A transaction trace, also referred to as a call stack, identifies instrumented components which have been called or invoked during the execution of one or more programs, processes or threads. Trace data of instrumented components can be used along with dependency data to understand and debug an application. A transaction trace can be a trace of all or a portion of a transaction and can extend over one or more computing devices having respective agents. In particular, a separate transaction trace can be provided for each agent, such that different threads are separated out into different transaction traces. The transaction trace can be provided by a graphical representation on a user interface display, such as in FIG. 9.

The transaction trace of FIG. 6 involves components C1, C2, C5 and C6, represented by graph portions 600, 602, 604 and 606, respectively. C1 starts executing at t0 and ends or stops at t7. C2, which is called by C1, starts executing at t1 and ends at t6. C5, which is called by C2, starts executing at t2 and ends at t5. C6, which is called by C5, starts executing at t2 and ends at t4. The time increments are not necessarily equidistant.

Figure 7:
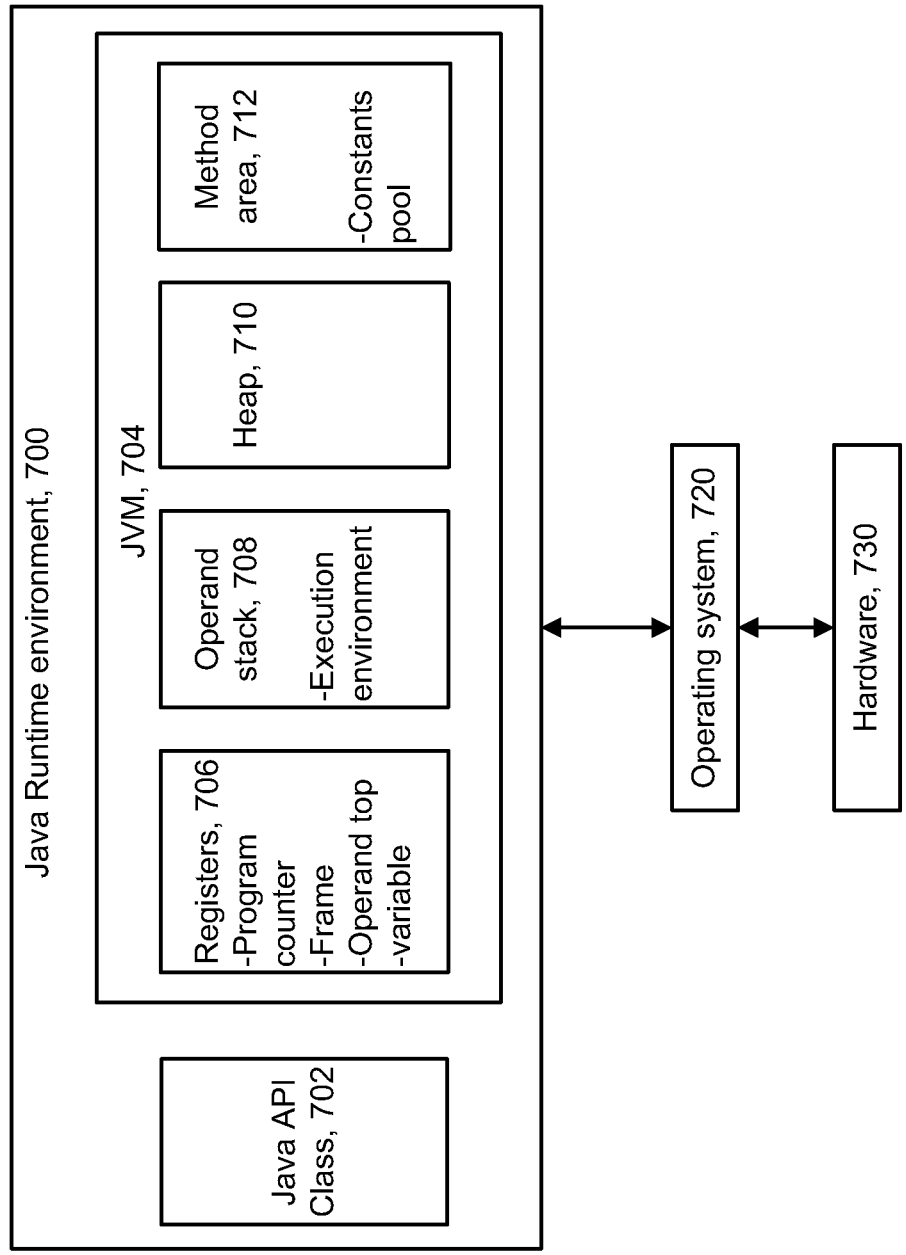
FIG. 7 depicts a JAVA runtime environment as one example execution environment of an application of FIG. 1.

FIG. 7 depicts a JAVA runtime environment as one example execution environment of an application of FIG. 1. The JAVA runtime environment 700 is built on an operating system, 720, which is built on hardware 730. The JAVA runtime environment includes a number of virtual parts, including the JAVA API Class 702 and a JVM 704. The JVM includes registers 706, an operand stack 708, a heap 710 and a method area 712. The JVM processes a stream of byte codes as a sequence of instructions. A JVM instruction consists of an opcode specifying the operation to be performed, followed by zero or more operands embodying values to be operated upon. The operand stack 708, heap 710 and method area 712 are within addressable memory. The size of an address is 32 bits, each memory location contains one byte, and each register stores one 32-bit address. The method area contains byte codes and is aligned on byte boundaries, while the operand stack and the heap are aligned on word (32-bit) boundaries.

The registers include a program counter (pc), which keeps track of where in the memory it should be executing instructions. The program counter identifies the next byte code to be executed. The frame register contains a pointer to the execution environment of the current method in the operand stack. The operand top (optop) register contains a pointer to the top of the operand stack, and is used to evaluate arithmetic expressions. The variable (vars) register contains a pointer to local variables.

The operand stack supplies parameters to methods and operations and receives results back from them. All byte code instructions take operands from the stack, operate on them, and return results to the stack. The operand stack includes a stack frame of an executing method. The stack frame holds the state, e.g., local variables, and intermediate results of calculations, for a particular invocation of a method. Specifically, each JVM thread has a private JVM stack, created at the same time as the thread. A JVM stack stores frames, holds local variables and partial results, and plays a part in method invocation and return. A frame is thus used to store data and partial results, as well as to perform dynamic linking, return values for methods, and dispatch exceptions. A new frame is created each time a method is invoked. A frame is destroyed when its method invocation completes, whether that completion is normal or abrupt (it throws an uncaught exception). Frames are allocated from the JVM stack of the thread creating the frame. Each frame has its own array of local variables, its own operand stack, and a reference to the runtime constant pool of the class of the current method.

The heap or memory allocation pool is garbage collected. The heap is the runtime data area from which memory for all class instances and arrays is allocated. The heap is created on virtual machine start-up, and heap storage for objects is reclaimed by an automatic storage management system known as a garbage collector. Specifically, each program running in the Java runtime environment has a garbage-collected heap assigned to it. Moreover, each class in the heap has a constant pool associated with it. Because constants do not change, they are usually created at compile time. Items in the constant pool encode all the names used by any method in a particular class. The class contains a count of how many constants exist, and an offset that specifies where a particular listing of constants begins within the class description.

The method area stores byte code instructions that are associated with methods in the compiled code, and a symbol table which the execution environment needs for dynamic linking Any debugging or additional information that might need to be associated with a method is stored in this area as well. The program counter always points to, e.g., contains the address of, some byte in the method area. The program counter is used to keep track of the thread of execution. After a byte code instruction has been executed, the program counter will contain the address of the next instruction to execute.

The method area is shared among all JVM threads, and stores per-class structures such as the runtime constant pool, field and method data, and the code for methods and constructors, including the special methods used in class and instance initialization and interface type initialization. The method area is created on virtual machine start-up. A runtime constant pool is a per-class or per-interface runtime representation of the constant pool table in a class file. It contains several kinds of constants, ranging from numeric literals known at compile time, to method and field references that must be resolved at run time. Each runtime constant pool is allocated from the JVM's method area. The runtime constant pool for a class or interface is constructed when the class or interface is created by the JVM.

Figure 8A:
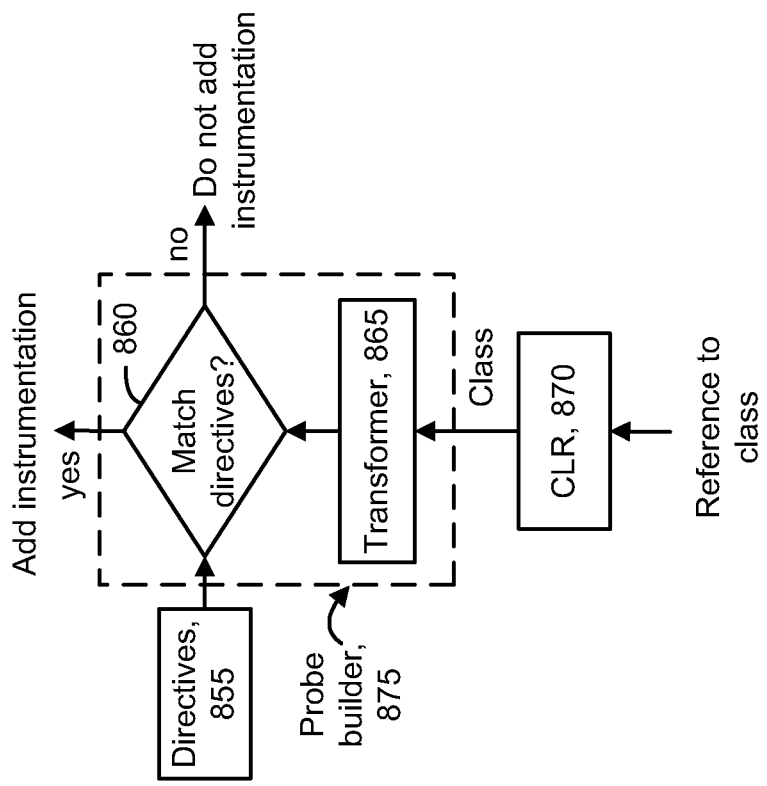
FIG. 8A depicts a JAVA-based example process flow for static instrumentation.

FIG. 8A depicts a JAVA-based example process flow for static instrumentation. The process may be implemented by an agent, such as depicted in FIG. 1, in one possible approach. One approach to instrumentation involves providing static rules which determine which components, such as methods, are to be instrumented. The rules are accessed, e.g., from one or more configuration files, at the time the components are loaded into the application. In such an approach, a class loader 820 is used to provide raw data bytes of an application byte code to a transformer 815, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 815 is thus software which can transform byte code to add instrumentation, such as by transforming classes. In one approach, the minimum unit of processing of the transformer 815 is a class file and its byte array.

If the application byte code matches rules (directives) 805 at a decision block 810, the transformer 815 adds probes in the form of tracer byte code. If the application byte code does not matches the rules 805 at the decision block 810, the transformer 815 does not add instrumentation to the byte code. The transformer 815 and the decision block 810 may be considered to be part of a probe builder 825.

In this implementation, the rules 805 are a set of typically static rules that identify portions of the managed application which are to be instrumented. The rules are usually implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting.

For instance, a rule may indicate that all servlets should be instrumented since it is believed that at least some of the servlets may provide interesting data. In this case, the rules 805 may indicate that all components that are subclasses of the JAVA class HttpServlet should be instrumented. HttpServlet is an abstract class from which all servlets depend. However, not all components can be instrumented, and there is a tension in that over-inclusive instrumentation results in excessive overhead costs and possibly impairing the operation of the application, while under-inclusive instrumentation results in the omission of important performance data.

Figure 8B:
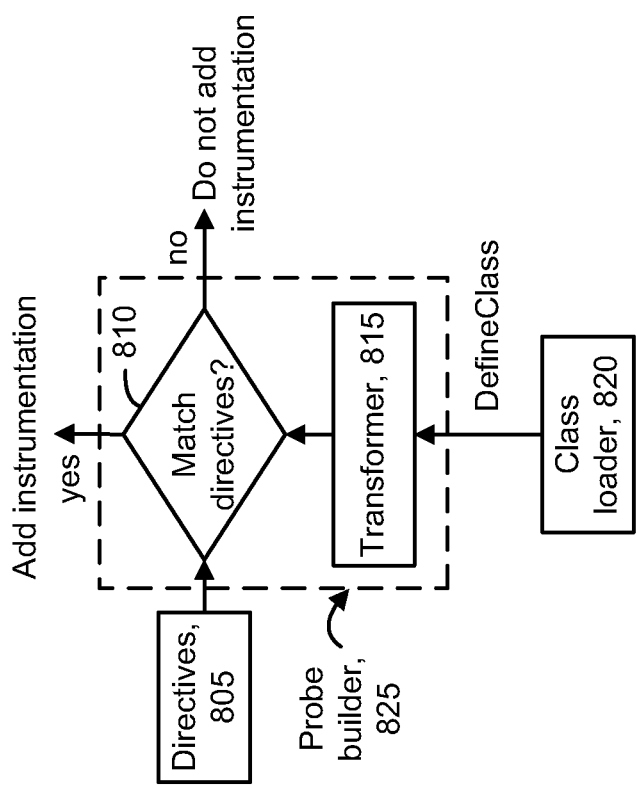
FIG. 8B depicts a .NET-based example process flow for static instrumentation.

FIG. 8B depicts a .NET-based example process flow for static instrumentation. In another possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, as other implementations are possible.

Here, the process may be implemented by an agent, in one possible approach. In one possible scenario, some process in the .NET framework references a class by name, and the CLR 870 finds the class, shows it to a transformer 865 (if any) and uses the resultant CIL. In particular, if the class matches rules 855 at a decision block 860, instrumentation is added. If the class does not match the rules 855 at the decision block 860, instrumentation is not added. The transformer 865 and the decision block 860 may be considered to be part of a probe builder 875.

Figure 9:
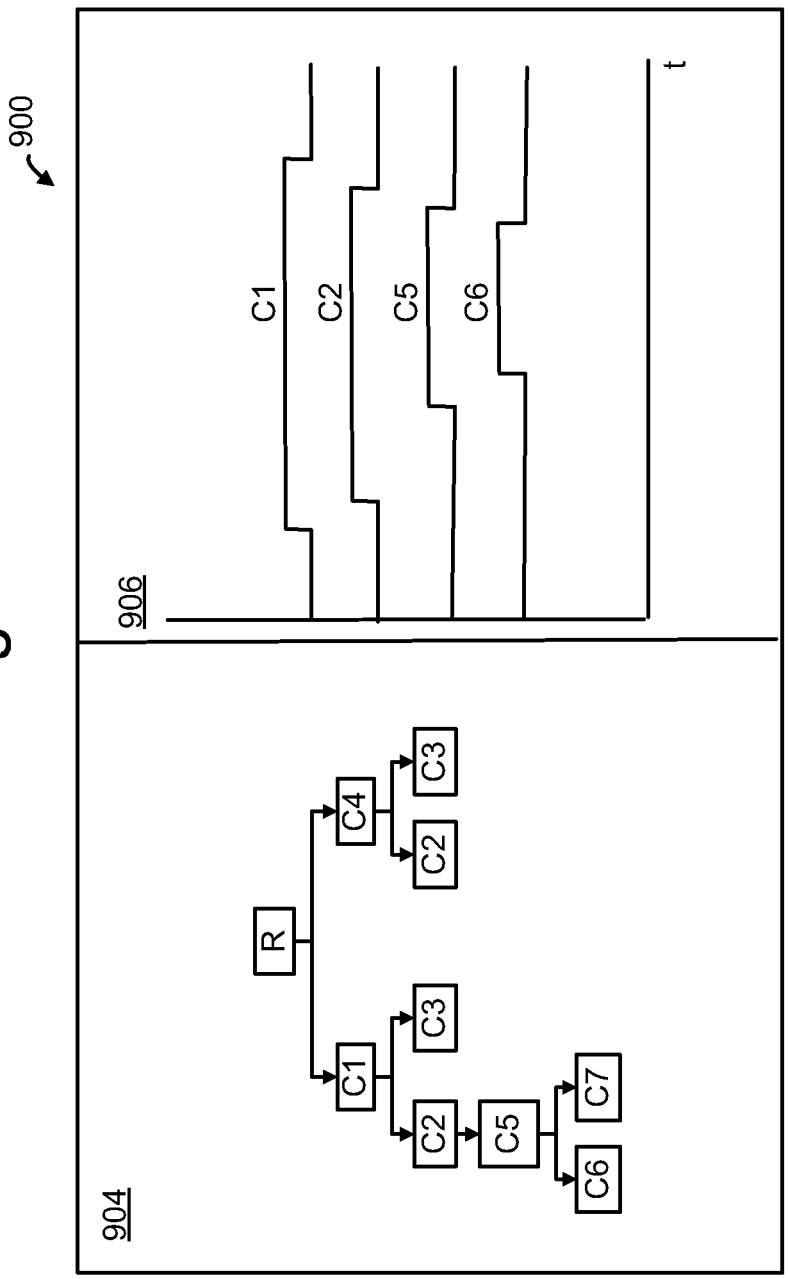
FIG. 9 depicts a user interface display which indicates a hierarchical relationship among components, and corresponding performance data.

FIG. 9 depicts a user interface display which indicates a hierarchical relationship among components, and corresponding performance data. The user interface 900 includes a display region 904 which identifies the names of one or more instrumented components, and a dependency relationship, such as in FIG. 5. The user can select one or more components in the display region 904 to display performance data, e.g., a trace, for that component based on its instrumentation, in a display region 906. The traces are based on FIG. 6 in this example. The display region 904 can be automatically populated with each of the components in the application using a hierarchical structure such as a tree which shows which components are under, or called by, another component. The display region 906 depicts performance data such as transaction traces of the instrumented components based on the instrumentation, for selected ones of the components in the region 904. The region 906 can be populated with performance data provided from an agent to a manager.

FIG. 10 depicts a process for applying rules to a current configuration file and an updated configuration file. A rules file (block 1004) includes a set of rules for merging or otherwise handling configuration files and entries in the configuration files. The entries are referred to as agent metadata entries. In some cases, an entry is a single line of source code. AN entry is a type of configuration by which a user controls the way a compiled code is instrumented. A current configuration file (e.g., a current version of the configuration file, block 1000) and a corresponding updated/new configuration file (e.g., an updated current version of the configuration file, block 1002), which is a new version of the current configuration file, are processed according to the rules. An output is the current configuration file (block 1006), a merged configuration file (e.g., a merged version of the configuration file, block 1008) which includes portions of the current and updated configuration files, or the updated configuration file (block 1010). The process can be repeated for each of the configuration files and for each entry of metadata in the configuration files, and is explained further in connection with FIGS. 11A to 15B.

As mentioned, agent metadata is typically provided in one or more configuration files which control a configuration of the agent. The performance of an application can be monitored by collecting metrics with the help of agents. The type of metrics generated, the recipient of these metrics and other aspects of agent behavior are controlled by metadata information contained within the set of configuration files used by the agent. Metadata entries can indicate many aspects of how the agent operates, such as how the agent adds instrumentation to an application. Examples of how the agent adds instrumentation to an application include directives which specify at least one method of a class or set of classes to monitor and a type of information to be collected in the application. These directives can be in the PBD files mentioned, for instance. Another example of how the agent is configured includes enabling or disabling a feature of the agent, setting a location of a server on which the agent runs, setting a type of communication used by agent to report data to a manager (e.g., plain socket, SSL, HTTP, HTTP over SSL), setting a location of configuration files used by the agent, setting a location of log files used by the agent, and setting a metric sending period/frequency, e.g., how often data obtained from instrumentation of the managed application is sent to the manager. Different types of data can have different sending frequencies. Other configurations regarding metrics can relate to a time period used for a running average, high and low threshold levels which are used to set an alarm or error condition and so forth.

In one approach, the configuration files include one or more agent profile files, Probe Builder Directive (PBD) files and Probe Builder List (PBL) file. However, this is an example only as these types of configuration files need not be used and other types of configuration files can be used additionally or alternatively. A software update for the agent can occur alone or in connection with a release of related Application Management (APM) software. An agent upgrade can include, e.g., one or more of agent JAR files, extension JAR files, dynamic-link library (DLL) files and configuration files (agent Profile, PBD and PBL). The software update can be as minor as enabling or disabling a property in a configuration file or major as a complete deployment of a new agent release.

To upgrade the agent software, the application server is stopped, the agent artifact(s) are updated, and the server is restarted. However, the process can be time-consuming and problematic when there are many agents to be upgraded. This can be compounded by the use of different operating systems and application servers. A major upgrade usually involves the introduction of new agent metadata, a change in existing metadata settings and/or removal of existing metadata one some occasions. The metadata information is contained within multiple configuration files, and the network administrator usually changes some of the agent metadata to customize it to better suit their application environment. During an upgrade, a network administrator has to manually merge all the existing configuration files with the updated/new configuration files to maintain the custom settings to the extent possible, while ensuring compatibility with the updated software. This process of manually merging can be time consuming and error-prone.

A solution provided herein reduces the complexity involved in merging different types of agent metadata while maintaining custom settings.

In one approach, a rule to not merge the current configuration file with the corresponding updated configuration file is set, e.g., by default or based on an input from the network administrator. In this case, the current configuration file is not merged with, or overwritten by, the corresponding updated metadata file, and the current configuration file continues to be used, as represented by output block 1006. In another approach, a rule to overwrite the current configuration file with the corresponding updated configuration file is set, e.g., by default or based on an input from the network administrator. In this case, the current configuration file is overwritten by, e.g., replaced by, the corresponding updated metadata file, as represented by output block 1010. In another approach, neither the rule to not merge, nor the rule to overwrite, is set. In this case, the current configuration file and the corresponding updated metadata file are merged to provide a merged configuration file, as represented by output block 1008. Another type of rule can specifically delete a configuration file. Note that different outputs may be obtained for different current configuration file.

Regarding the rules for the metadata entries, these can include a rule to delete a metadata entry, and a rule to prefer a metadata entry in an updated configuration file over a corresponding metadata entry in a current configuration file, or to prefer a metadata entry in a current configuration file over a corresponding metadata entry in an updated configuration file, as discussed further below. One or more instances of each rule can be used. The rules can be deployed in one or more files and executed on a computing device which has access to the current and updated configuration files. Moreover, the process depicted in FIG. 10 can occur during the upgrade of an agent or by using a merging utility tool, for instance. A merging utility tool allows the network administrator to create the configuration files which can be used to upgrade an agent without actually performing the upgrade, such as for evaluation or study purposes.

The rules of FIGS. 12A-D, 14A and 15A can be created manually.

Figure 11A:
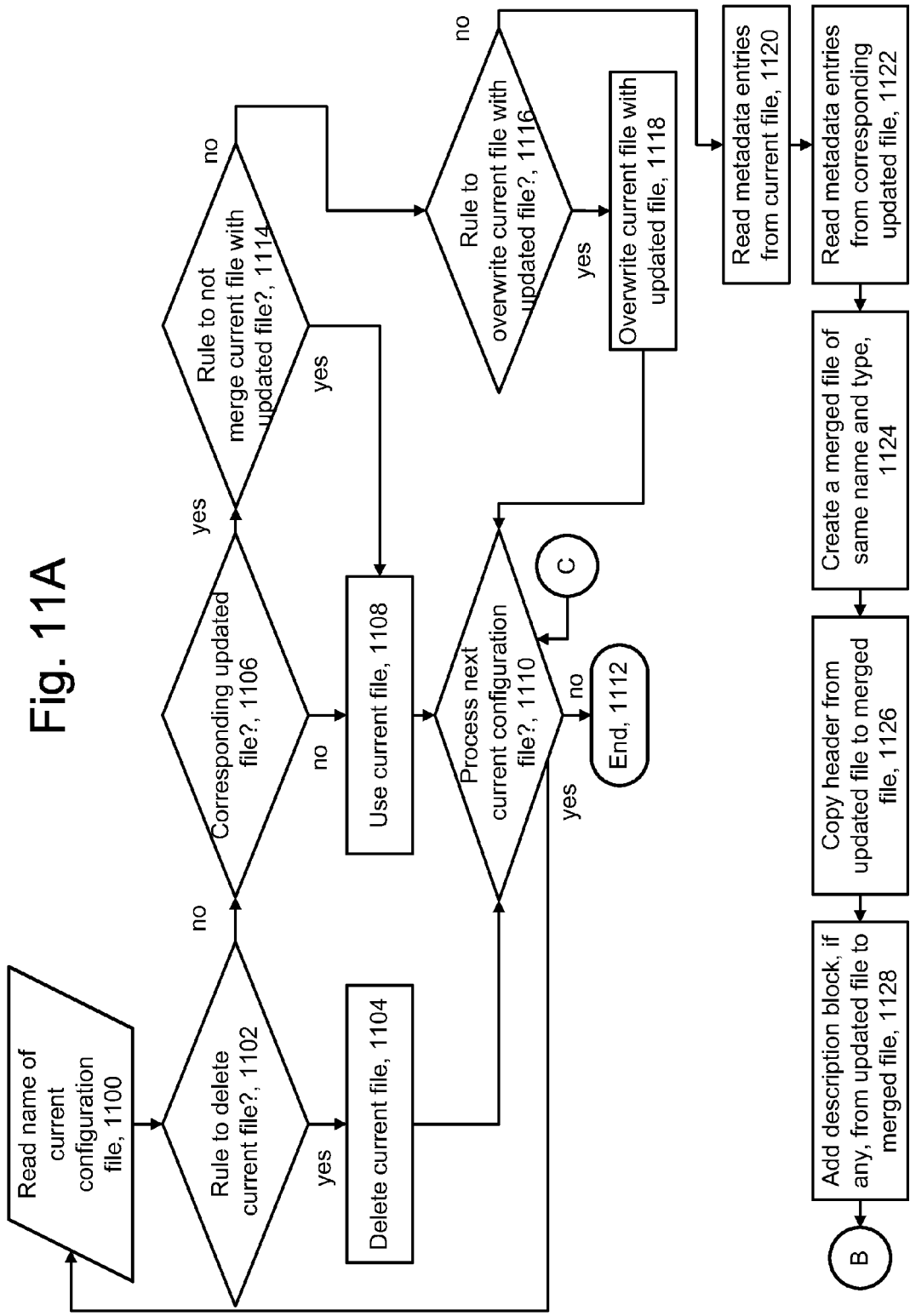
FIG. 11A depicts the first part of a flowchart of the process of FIG. 10, showing processing at the file level.

FIG. 11A depicts the first part of a flowchart of the process of FIG. 10, showing processing at the file level. This flowchart can be followed once for each configuration file, for instance. Step 1100 is a data input step which reads the name of a current configuration file, e.g., from a known storage location such as a specified directory of current configuration files. Decision step 1102 determines if there is a rule to delete the current configuration file. FIG. 12A provides an example of such a rule. If there is such a rule, the current configuration file is deleted at step 1104 (or the current configuration file is otherwise not used by the agent) and step 1110 determines if there is a next current configuration file to process. If step 1110 is true, the control flow proceeds back to step 1100, where the name of the next current configuration file is read. If step 1110 is false, the process ends, at step 1112. If decision step 1102 is false, decision step 1106 determines whether there is a corresponding updated configuration file. This can be a file with the same name as the current configuration files, which is located by accessing a known storage location such as a directory of updated configuration files. If decision step 1106 is false, the current configuration file is used, at step 1108. If decision step 1106 is true, decision step 1114 determines whether there is a rule to not merge the current configuration file with the corresponding updated configuration file. FIG. 12B provides an example of such a rule. If decision step 1114 is true, the current configuration file is used, at step 1108.

If decision step 1114 is false, decision step 1116 determines whether there is a rule to overwrite the current configuration file with the corresponding updated configuration file. FIG. 12C provides an example of such a rule. If decision step 1116 is true, the current configuration file is overwritten by the corresponding updated configuration file (or the current configuration file is otherwise not used by the agent and the updated configuration file is used by the agent), at step 1118. If decision step 1116 is false, step 1120 is reached, where the metadata entries are read from the current configuration file. At step 1122, the metadata entries are read from the corresponding updated configuration file. Step 1124 creates a new, merged configuration file of the same name and type as the current and updated configuration files. The merged configuration file may initially be empty, e.g., have no header or description block or metadata entries. Step 1126 copies the header from the updated configuration file to the merged configuration file. This can include adding at least one of a header block and a description block from the updated version of the configuration file, but not from the current version of the configuration file, to the merged version of the configuration file. Step 1128 copies a description block, if any, from the updated configuration file to the merged configuration file. See FIGS. 13, 14B and 15B for examples. The flowchart continues at "B" in FIG. 11B.

Figure 11B:
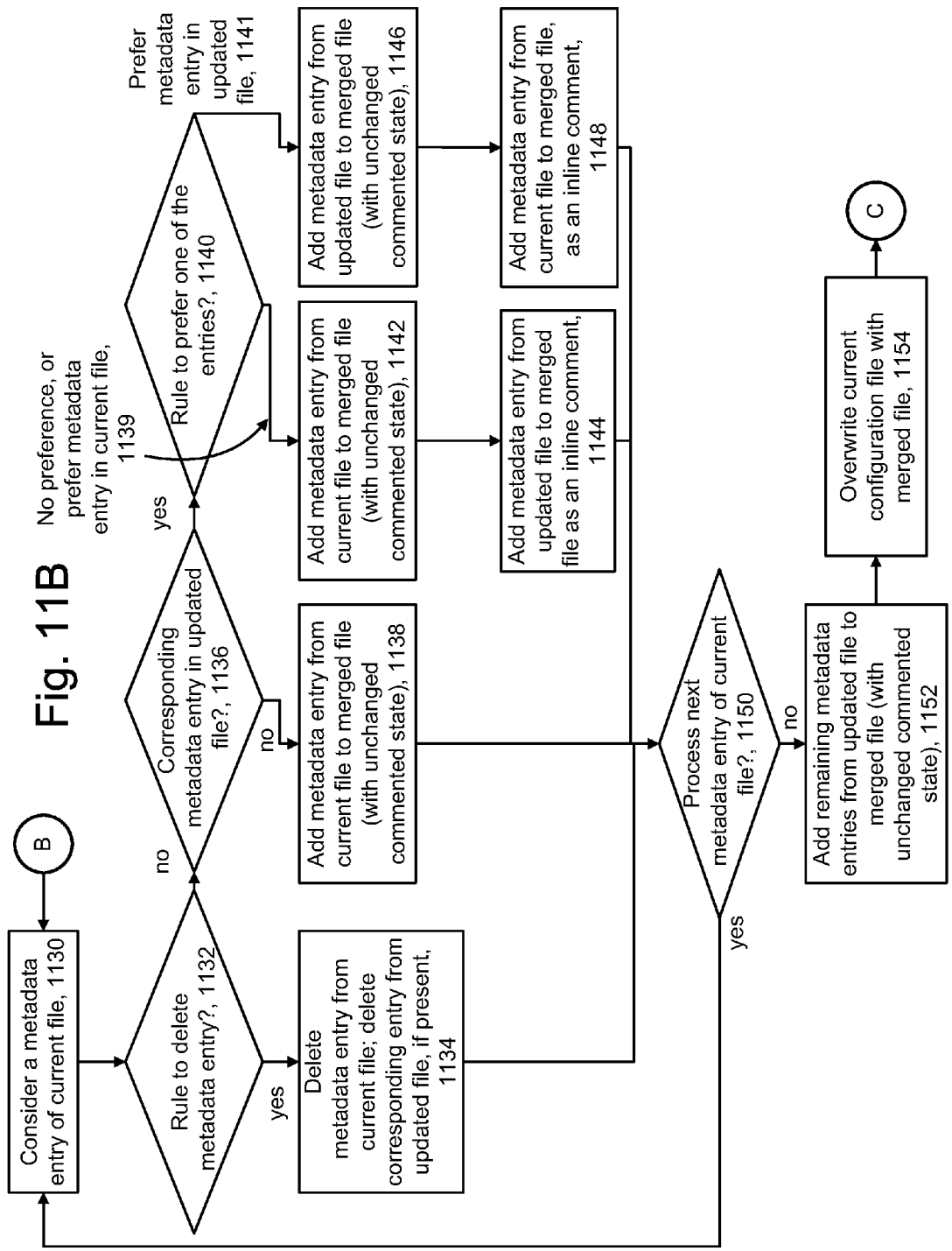
FIG. 11B depicts the second part of the flowchart of FIG. 11A, showing processing at the entry level.

FIG. 11B depicts the second part of the flowchart of FIG. 11A, showing processing at the entry level. This flowchart can be followed once for each entry in a configuration file, for instance. Step 1130 considers a metadata entry of a configuration file. For instance, the first entry may be considered in a first pass. Decision step 1132 determines whether there is a rule to delete the metadata entry. FIG. 14A provides an example of such a rule. If there is such a rule, step 1134 deletes the metadata entry from the current configuration file, and a corresponding entry, if present, is also deleted from the corresponding updated configuration file (or the entries are otherwise not used by the agent). Subsequently, step 1150 determines whether there is a next metadata entry to process. If decision step 1150 is true, the control flow proceeds to step 1130 where the next metadata entry is considered.

If decision step 1132 is false, decision step 1136 determines whether there is a corresponding metadata entry in the corresponding updated configuration file. For example, the entry in the current version of the configuration file can comprise a key-value pair (e.g., key1-value1), where the corresponding entry in the updated version of the configuration file also comprises a key-value pair (e.g., key1-value2), where the keys are the same (e.g., key1) and the values are different (e.g., value1, value2). If decision step 1136 is false, step 1138 adds the metadata entry from the current configuration file to the corresponding merged configuration file (created at step 1124 in FIG. 11A). Additionally, the commented state of the metadata entry from the current configuration file is unchanged.

In one commented state, a metadata entry is a comment such as a line comment, also referred to as inline comment. A line comment can start with a comment delimiter (e.g., "#" or "//"), and continue until the end of the line, or in some cases, start at a specific column (character line offset) in the source code, and continue until the end of the line. An example of such a metadata entry is "#meta.data.entry2=Yellow" in FIG. 13 as entry CME3. In another commented state, the metadata entry is a compilable instruction, which does not have a comment delimiter. An example of such a metadata entry is "meta.data.entry2=Blue" in FIG. 13 as entry CME2. Example of metadata entries which are handled according to step 1138 include CME1 to CME4 in FIG. 13, CME1 to CME3, CME5 and CME6 in FIG. 14B, and CME1 to CME4 in FIG. 15B.

An entry which includes an executable or compilable instruction can be changed to a line comment in different situations. For example, there may be multiple entries to choose from, but only one entry applies (or fewer than all entries apply) to a specific situation. Consider the following entries, where each line applies to a respective computing platform:
apm.agent.platform.monitor.system=SolarisAmd32
apm.agent.platform.monitor.system=SolarisAmd64
apm.agent.platform.monitor.system=SolarisSparc32
apm.agent.platform.monitor.system=SolarisSparc64
apm.agent.platform.monitor.system=AIXPSeries32
apm.agent.platform.monitor.system=AIXPSeries64
apm.agent.platform.monitor.system=HP-UXItanium32

In this case, one of the entries can be edited so that it is not a comment (e.g., by removing the "#"), according to the appropriate computing platform being used. In another situation, an entry is changed to a comment by adding the comment delimiter when the function provided by the entry is not desired at a certain time, and can be later activated again by removing the comment delimiter. The adding and removing of the comment delimiter can be performed manually, in one approach.

If decision step 1136 is true, decision step 1140 determines whether there is a rule to prefer one of the entries over the other (e.g., to prefer the entry in the updated configuration file over the entry in the current configuration file—path 1141, or to prefer the entry in the current configuration file over the entry in the updated configuration file, or no preference—path 1139). FIGS. 12D and 15A provide an example of such a rule. If there is no such preference, or if the metadata entry in the current configuration file is preferred, step 1142 adds the metadata entry from the current configuration file to the merged configuration file. Additionally, the commented state of the metadata entry from the current configuration file is unchanged, as in step 1138. Furthermore, step 1144 adds the metadata entry from the updated configuration file to the merged configuration file. However, the metadata entry from the updated configuration file is added as an inline comment, regardless of the comment state of the metadata entry from the updated configuration file. Thus, if the metadata entry from the updated configuration file is an inline comment in the updated configuration file, it maintains this state in the merged configuration file. If the metadata entry from the updated configuration file is a compilable instruction in the updated configuration file, it is changed to a line comment in the merged configuration file.

Step 1142 allows a custom setting of the entry in the current configuration file, if present, to be maintained (e.g., a setting of the entry as a comment or compilable instruction). Moreover, by including the entry from the updated configuration file as an inline comment, the entry can be later activated, e.g., by the network administrator manually removing the comment delimiter and adding a comment delimiter to the corresponding entry from the current configuration file. Further, the existence of the entry from the updated configuration file is documented in the merged configuration file. For examples of metadata entries which are handled according to step 1142, see step 1138, discussed above. An example of a metadata entry which is handled according to step 1144 includes UME1 in FIG. 15B.

If decision step 1140 indicates that the rule prefers the metadata entry in the updated configuration file, step 1146 adds the metadata entry from the updated configuration file to the merged configuration file, with an unchanged comment state. Step 1148 adds the metadata entry from the current configuration file to the merged configuration file as an inline comment, analogous to step 1144. Thus, if the metadata entry from the current configuration file is an inline comment in the current configuration file, it maintains this state in the merged configuration file. If the metadata entry from the current configuration file is a compilable instruction in the current configuration file, it is changed to a line comment in the merged configuration file.

If decision step 1150 is false, any remaining metadata entries from the updated configuration file are added to the merged configuration file, with an unchanged commented state, at step 1152. Step 1154 overwrites the current configuration file with the merged configuration file (or otherwise uses the merged configuration file to control the agent in place of the current configuration file). The control flow can proceed via "C" to step 1110 in FIG. 11A to process a next configuration file.

FIG. 12A depicts an example of a delete file rule of the rules file 1004 of FIG. 10. A Delete File Rule controls the deletion of a current configuration file. It deletes an existing file matching the name and type specified in the rule. In this example, the Delete File Rule deletes an existing file named "SampleFile.pbd" and of type "pbd." In one possible approach, the rules are in an XML file and use an XML schema. The rules are written based on a grammar of the schema. There can be several types of rules, and some can have default values. The rule is depicted as multiple lines of executable or compilable source code. In some cases, the network administrator or other personnel can update the rules by modifying an existing rules XML file or creating a new one.

The first line is: <?xml version="1.0" encoding="UTF-8"?>. Xml version="1.0" indicates the version of the Extensible Markup Language (XML) which is used. Encoding="UTF-8" indicates that 8-bit multibyte character encoding is used.

The second line is: <rules xmlns=" ", where <rules is the opening tag, and the xmlns attribute specifies the XML namespace for a document.

The third line is: xmlns:xsi="http://www.w3.org/2001/XMLSchema-instance," where xmlns:xsi references a schema in an XML document and http://www.w3.org/2001/XMLSchema-instance specifies the default namespace declaration. This declaration tells a schema-validator that all the elements used in this XML document are declared in this namespace.

The fourth line is:
xsi:noNamespaceSchemaLocation="MetadataMerge
 Rules1.0.xsd">, where
MetadataMergeRules1.0 is a name of an XML Schema Definition (.xsd).

The fifth line is: <delete-file type="pbd" name="SampleFile.pbd"/>, where delete-file is the name of the rule, pbd is the type of configuration file to delete, and SampleFile.pbd is the name of the configuration file to delete.

The sixth line is: </rules>, which is the closing tag.

Lines 1-4 are the same in FIGS. 12B to 12D, 14A and 15A.

FIG. 12B depicts an example of a no merge file rule of the rules file 1004 of FIG. 10. If an updated configuration file exists with the same name and type as the current configuration file, the No Merge File Rule prevents overwrite or merge of the latter by the former. Here, the No Merge File Rule prevents overwrite or merge of a current configuration file named SampleFile.profile and of type profile. Specifically, the fifth line is: <no-merge-file type="profile" name="SampleFile.profile"/>, where no-merge-file is the name of the rule, profile is the type of configuration file to not merge, and SampleFile.profile is the name of the configuration file to not merge.

FIG. 12C depicts an example of an overwrite file rule of the rules file 1004 of FIG. 10. If an updated configuration file exists with the same name and type as the current configuration file, the Overwrite File Rule overwrites the latter by the former. Here, the Overwrite File Rule overwrites the current configuration file named SampleFile.pbl and of type pbl with the updated version of the file. Specifically, the fifth line is: <overwrite-file type="pbl" name="SampleFile.pbl"/>, where overwrite-file is the name of the rule, pbl is the type of configuration file to overwrite, and SampleFile.pbl is the name of the configuration file to overwrite.

FIG. 12D depicts an example of a preferred entry rule of the rules file 1004 of FIG. 10. In cases where there is a conflict between corresponding (having a same name or key) metadata entries while merging a current configuration file and an updated configuration file, the Preferred Entry Rule decides which file's metadata entry has a preference. In the absence of a rule, the metadata entry from the current configuration file can be given a preference, in one approach. Here, the Preferred Entry Rule gives preference to the values(s) of metadata entry example.entry from the updated configuration file of type profile in case of a conflict. Specifically, the fifth line is: <preferred-entry type="profile" preference="U" name="example.entry"/>, where preferred-entry is the name of the rule, profile is the type of configuration file in which the entry is located, U (updated) is a designation that the entry of the specified name (example.entry) is preferred, and example.entry is the name of the metadata entry in the updated configuration file to prefer over the like-named entry in the current configuration file.

FIG. 13 depicts an example of a no-conflict merge scenario according to the process of FIG. 10. A current configuration file 1300 is merged with a corresponding, e.g., like-named, updated configuration file 1320 to create a merged configuration file 1310. Each file is named Sample.profile. The merged configuration file, instead of the current or updated configuration file, controls a configuration of the agent. Each file includes a number of entries. An entry can include one or more lines of code, including inline comments and executable or compilable instructions. CHB1 denotes the current (C) configuration file, header block (HB), first entry (1) of this type. "#" denotes an inline comment. Thus, CHB1 includes a first line of: # Sample.profile ver. 1.0, which is a comment indicating a version of the file, and a second line of: #App. Monitoring, ver. 9.1 which indicates a version of a program referred to as "App. Monitoring." A header is code at the top of a file which provides general identifying information about the file.

The third line of the file is: #1st type metadata entry, which is a comment describing the entry in the next line. In the fourth line, CME1 denotes the current (C) configuration file, metadata entry (ME), first entry (1) of this type. The entry is: Meta.data.entry.1=Red, a key-value pair in which "Red" is the value assigned to the key of Meta.data.entry.1.

The fifth line of the file is: #2nd type metadata entry, which is a comment describing the entry in the next line. In the sixth line, CME2 denotes the second entry (2) of this type. The entry is: Meta.data.entry.2=Blue, a key-value pair in which "Blue" is the value assigned to the key of Meta.data.entry.2. CME2 is compilable code. In the seventh line, CME3 denotes the third entry (3) of this type. The entry is: #Meta.data.entry.2=Yellow, a key-value pair in which "Yellow" is the value assigned to the key of Meta.data.entry.2. CME3 is an inline comment.

The eighth line of the file is: #3rd type metadata entry, which is a comment describing the entry in the next line. In the ninth line, CME4 denotes the fourth entry (4) of this type. The entry is: Meta.data.entry.3=Green, a key-value pair in which "Green" is the value assigned to the key of Meta.data.entry.3. CME4 is compilable code.

Red, Blue, Yellow and Green and the other colors used are symbolic examples of values used for metadata entries. For example, Red could be a numerical value in seconds of a period for transmitting a first metric, Blue and Yellow could be numerical values in seconds of different periods for transmitting a second metric, and Green could be a numerical value in seconds of a period for transmitting a third metric. These are metric sending periods, e.g., how often data obtained from instrumentation of the managed application is sent to the manager. The colors could alternatively represent values for other types of agent metadata, such as the type of metrics generated, the recipient of these metrics, directives which specify at least one method of a class or set of classes to monitor and a type of information to be collected in the application, enabling or disabling a feature of the agent, setting a location of a server on which the agent runs, setting a type of communication used by agent to report data to a manager (e.g., plain socket, SSL, HTTP, HTTP over SSL), setting a location of configuration files used by the agent, and setting a location of log files used by the agent.

If the entry in the current version of the configuration file provides one period and the corresponding entry in the updated version of the configuration file provides another, different period, the entries define conflicting periods at which the agent reports a metric obtained from the application.

In the updated configuration file 320, UHB1 denotes the updated (U) configuration file, header block (HB), first entry (1) of this type. UHB1 includes a first line of: # Sample.profile ver. 2.0, and a second line of: #App. Monitoring, ver. 9.1. Thus, the version of the App. Monitoring software is the same as the current configuration file but the version of the Sample.profile file is a later version, 2.0 vs. 1.0.

The third line of the file is: #4th type metadata entry, which is a comment describing the entry in the next line. In the fourth line, UME1 denotes the updated (U) configuration file, metadata entry (ME), first entry (1) of this type. The entry is: Meta.data.entry.4=Purple, a key-value pair in which "Purple" is the value assigned to the key of Meta.data.entry.4. UME1 is compilable code. The fifth line of the file is: #5th type metadata entry, which is a comment describing the entry in the next line. In the sixth line, UME2 denotes the second entry (2) of this type. The entry is: Meta.data.entry.5=Pink, a key-value pair in which "Pink" is the value assigned to the key of Meta.data.entry.5. UME2 is compilable code.

In the merged configuration file 1310, the header block UHB1 of the updated configuration file is copied to the merged configuration file to provide MHB1. MHB1 denotes the merged (M) configuration file, header block (HB), first entry (1) of this type. The entries CME1 to CME3 exist only in the current configuration file (there are no corresponding entries in the updated configuration file) and are copied to the merged configuration file as MME1 to MME3, respectively, regardless of their commented state. Thus, both the compilable instructions CME1 and CME2 and the inline comment CME3 are moved to the merged configuration file 1310. Similarly, UME1 and UME2 exist only in the updated configuration file and are copied to the merged configuration file as MME5 and MME6, respectively. In this example, there are no conflicting entries in the current and updated configuration files.

FIG. 14A depicts an example of a delete entry rule of the rules file 1004 of FIG. 10. The Delete Entry Rule deletes an entry from a current configuration file and/or an updated configuration file. For example, an entry may be deleted when it is no longer used, or when it is determined to create a bug or other problem. Here, the Delete Rule deletes the entry named j2ee.pbl and of type pbl. Specifically, the fifth line is: <delete-entry type="pbl" name="j2ee.pbd"/>, where delete-entry is the name of the rule, pbl is the type of entry to delete. In this case, the metadata entry is the name of a PBD file, as opposed to a key-value pair.

In creating a merged version of a configuration file, if the rules indicate that another entry (CME4) in the current version of the configuration file 1400 should be deleted, the another entry in the current version of the configuration file is not included in the merged version of the configuration file 1410 and a corresponding entry (UME4), if any, in the updated version of the configuration file 1420, is also not included in the merged version of the configuration file.

FIG. 14B depicts an example of a merge with deletion scenario according to the process of FIG. 10 and the delete entry rule of FIG. 14A. A similar naming convention as discussed above is used. DB represents a description block, such as in CDB1, MDB1 and UDB1. A description block is additional text that describes the file. It is similar to the header but separate. A current configuration file 1400 is merged with a corresponding, e.g., like-named, updated configuration file 1420 to create a merged configuration file 1410. Each file is named Sample.pbl. The header block UHB1 is copied to the merged configuration file as MHB1. The description block UDB1 is copied to the merged configuration file as MDB1. In absence of any preference rule, the entries CME1, CME2, CME3, CME5 and CME6 (toggles-typical.pbd, required.pbd, jvm.pbd java2.pbd and ServletHeaderDecorator.pbd, respectively) from the current PBL are given preference over entries from updated PBL in case of conflicts and are copied to the merged PBL with their existing commented states, as MME1 to MME5, respectively. In this case, CME1, CME2, CME3, CME5 and CME6 conflict with UME1, UME2, UME3, UME5 and UME7, respectively. That is, the entries in the current version of the configuration file and the corresponding entries in the updated version of the configuration file, define conflicting directives (e.g., PBD files) regarding at least one method of a class or set of classes to monitor and a type of information to be collected in the application.

Entry CME4 or UME4 (j2ee.pbd) is not copied to the merged PBL since it is intended for deletion per the entry deletion rule. Entry UME6 (appmap.pbd) only exists in the updated configuration file (there is no corresponding entry in the current configuration file) and is copied to the merged configuration file as MME6.

FIG. 15A depicts an example of preferred entry rule of the rules file 1004 of FIG. 10. The Preferred Entry Rule prefers or selects an entry from the current (C) or updated (U) configuration file when the same named entry exists in both, typically as the same key of a key-value pair. A preference for the current configuration file may be used, e.g., when it is acceptable to continue using an entry, which may have a custom setting or a default setting, in the current configuration file. A preference for the updated configuration file may be used, e.g., when it is not acceptable or desirable to continue using such an entry in the current configuration file, and it is preferred or required to use the entry in the updated configuration file. Here, the fifth line states: <preferred-entry type="profile" preference="C" name="meta.data.entry.2"/>, where preferred-entry is the name of the rule, profile is the type of the file of the entry to prefer, "C" indicates the current entry (the entry in the current configuration file) is preferred over the updated entry (the entry in the updated configuration file), and meta.data.entry.2 is the name of the entry. Similarly, the sixth lines states: <preferred-entry type="profile" preference="U" name="meta.data.entry.3"/>, where "U" indicates the updated entry is preferred over the current entry, and meta.data.entry.3 is the name of the entry.

FIG. 15B depicts an example of a merge with conflict scenario according to the process of FIG. 10 and the preferred entry rule of FIG. 15A. A similar naming convention as discussed above is used. A current configuration file 1500 is merged with a corresponding updated configuration file 1520 to create a merged configuration file 1510. The header UHB1 is copied from the updated configuration file 1520 to the merged configuration file as MHB1. The entry meta.data.entry.1 exists only in the current configuration file as CME1 and is copied to the merged configuration file as MME1. The entry meta.data.entry.2 exists in both the current configuration file (as CME2 and CME3) and the updated configuration file (as UME1), but preference is given to the current entry per the rule, so that CME2 and CME3 are copied to provide MME2 and MME3, respectively. Additionally, UME1 is copied as an inline comment to provide MME4. That is, the comment state of UME1 is changed from a compilable instruction to an inline comment, since the corresponding entry (CME2 and CME3) in the current configuration file is preferred by the rule: <preferred-entry type="profile" preference="C" name="meta.data.entry.2"/>.

The entry meta.data.entry.3 exists in both the current configuration file (as CME4) and the updated configuration file (as UME2 and UME3), but preference is given to the updated entry per the rule, so that UME2 and UME3 are copied to provide MME5 and MME6, respectively. Additionally, CME4 is copied as an inline comment to provide MME7. That is, the comment state of CME4 is changed from a compilable instruction to an inline comment, since the corresponding entry (UME2 and UME3) in the updated configuration file is preferred by the rule: <preferred-entry type="profile" preference="U" name="meta.data.entry.3"/>. Entries meta.data.entry.4 (UME4) and meta.data.entry.5 (UME5) exist only in the updated configuration file and are copied to the merged configuration file as MME8 and MME9, respectively.

Thus, a process includes creating a merged version of the configuration file 1510 based on the current version of the configuration file 1500, an updated version of the configuration file 1520, and rules 1004, and using the merged version of the configuration file to control the agent. The creating the merged version of the configuration file comprises: identifying an entry (CME2, CME3; CME4) in the current version of the configuration file for which there is a corresponding entry (UME1; UME2, UME3) in the updated version of the configuration file; selecting one of: (a) the entry in the current version of the configuration file and (b) the corresponding entry in the updated version of the configuration file, as a selected entry, based on at least one preference in the rules (in this case, CME2 and CME3 are preferred over UME1, and UME2 and UME3 are preferred over CME4); and based on the selecting, adding the selected entry (CME2, CME3; UME2, UME3) to the merged version of the configuration file (as MME2, MME3; MME5, MME6, respectively).

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method, comprising:
   configuring an agent with a current version of a configuration file, the current version of the configuration file comprises metadata entries, the metadata entries comprise a customized entry;
   using the agent, instrumenting and monitoring an application according to the current version of the configuration file;
   receiving an updated version of the configuration file, the updated version of the configuration file comprises metadata entries comprising a corresponding entry which corresponds to the customized entry;
   based on a rule, determining whether the customized entry is preferred over the corresponding entry; and
   creating a merged version of the configuration file based on the current version of the configuration file and an updated version of the configuration file, the merged version of the configuration file uses the customized entry as a selected entry in place of the corresponding entry as an unselected entry if the customized entry is preferred over the corresponding entry, and the merged version of the configuration file uses the corresponding entry as the selected entry in place of the customized entry as the unselected entry if the customized entry is not preferred over the corresponding entry; and
   using the agent, instrumenting and monitoring the application according to the merged version of the configuration file.

2. The computer-implemented method of claim 1, wherein the creating the merged version of the configuration file comprises:
   when the selected entry is a line comment, adding the selected entry to the merged version of the configuration file as a line comment; and
   when the selected entry is a compilable instruction, adding the selected entry to the merged version of the configuration file as a compilable instruction.

3. The computer-implemented method of claim 1, wherein the unselected entry is a compilable instruction, and the creating the merged version of the configuration file comprises:
   adding the unselected entry to the merged version of the configuration file as a line comment, the line comment comprises a comment delimiter followed by the compilable instruction.

4. The computer-implemented method of claim 1, wherein:
   the customized entry and the corresponding entry define conflicting enabled/disabled statuses of a feature of the agent; and
   the rule indicates whether to use the enabled/disabled status of the customized entry or the enabled/disabled status of the corresponding entry in the merged version of the configuration file.

5. The computer-implemented method of claim 1, wherein:
   the customized entry and the corresponding entry define conflicting types of communication used by the agent; and
   the rule indicates whether to use the type of communication of the customized entry or the type of communication of the corresponding entry in the merged version of the configuration file.

6. The computer-implemented method of claim 1, wherein:
   the customized entry and the corresponding entry define conflicting locations of a log file of the agent; and
   the rule indicates whether to use the location of the customized entry or the location of the corresponding entry in the merged version of the configuration file.

7. The computer-implemented method of claim 1, wherein:
   the customized entry and the corresponding entry define conflicting periods at which the agent reports a metric obtained from the application; and
   the rule indicates whether to use the period of the customized entry or the period of the corresponding entry in the merged version of the configuration file.

8. The computer-implemented method of claim 1, wherein:
   the customized entry and the corresponding entry define conflicting directives regarding at least one method of a class or set of classes to monitor in the application; and
   the rule indicates whether to use the directive of the customized entry or the directive of the corresponding entry to provide the merged version of the configuration file.

9. The computer-implemented method of claim 1, wherein:
   the customized entry and the corresponding entry, define conflicting directives regarding a type of information to be collected in the application; and
   the rule indicates whether to use the directive of the customized entry or the directive of the corresponding entry to provide the merged version of the configuration file.

10. The computer-implemented method of claim 1, wherein the creating the merged version of the configuration file comprises:
  adding at least one of a header block or a description block from the updated version of the configuration file, but not from the current version of the configuration file, to the merged version of the configuration file.

11. The computer-implemented method of claim 1, wherein:
  the customized entry comprises a key-value pair;
  the corresponding entry comprises a key-value pair, where the keys are the same and the values are different; and
  the rule indicates whether to use the value of the customized entry or the value of the corresponding entry in the merged version of the configuration file.

12. The computer-implemented method of claim 11, wherein the creating the merged version of the configuration file comprises:
  identifying any other entry in the current version of the configuration file and in the updated version of the configuration file which is a line comment and which comprises a key-value pair comprising the key; and
  adding the any other entry as a line comment to the merged version of the configuration file.

13. The computer-implemented method of claim 1, wherein:
  the selected entry controls how the agent adds instrumentation to the application.

14. The computer-implemented method of claim 13, wherein:
  the selected entry controls how the agent processes data obtained from the instrumentation.

15. The method of claim 1, wherein:
  the customized entry comprises a directive to instrument a method of the application and the corresponding entry comprises a directive to not instrument a method of the application, or the customized entry comprises a directive to not instrument the method of the application and the corresponding entry comprises a directive to instrument the method of the application.

16. The method of claim 1, wherein:
  the customized entry is made by a network administrator by modifying an existing entry in a configuration file.

17. A memory comprising computer readable software embodied thereon for programming a processor to perform a method, the method comprising:
  configuring an agent with a current version of a configuration file;
  using the agent, instrumenting and monitoring an application according to the current version of the configuration file;
  receiving an updated version of the configuration file;
  accessing a rule, the rule indicates whether the current version of the configuration file should be: continued without being overwritten or merged, overwritten by the updated version of the configuration file, or merged with the updated version of the configuration file;
  if the rule indicates that the current version of the configuration file should be continued without being overwritten or merged, continuing the instrumenting and monitoring of the application according to the current version of the configuration file;
  if the rule indicates that the current version of the configuration file should be overwritten by the updated version of the configuration file, instrumenting and monitoring the application according to the updated version of the configuration file and discontinuing the instrumenting and monitoring of the application according to the current version of the configuration file; and
  if the rule indicates that the current version of the configuration file should be merged with the updated version of the configuration file: creating a merged version of the configuration file based on the current version of the configuration file, the updated version of the configuration file and the rule, instrumenting and monitoring the application according to the merged version of the configuration file, and discontinuing the instrumenting and monitoring of the application according to the current version of the configuration file, wherein the creating the merged version of the configuration file comprises:
    identifying an entry in the current version of the configuration file for which there is a corresponding entry in the updated version of the configuration file;
    selecting the entry in the current version of the configuration file or the corresponding entry in the updated version of the configuration file, as a selected entry, based on a preference in the rule; and
    adding the selected entry to the merged version of the configuration file.

18. The memory of claim 17, wherein the creating the merged version of the configuration file comprises:
  when the selected entry is a line comment, adding the selected entry to the merged version of the configuration file as a line comment; and
  when the selected entry is a compilable instruction, adding the selected entry to the merged version of the configuration file as a compilable instruction.

19. The memory of claim 17, wherein the creating the merged version of the configuration file comprises:
  identifying the entry in the current version of the configuration file or the corresponding entry, as an unselected entry; and
  regardless of whether the unselected entry is a line comment or a compilable instruction, adding the unselected entry to the merged version of the configuration file as a line comment.

20. The memory of claim 17, wherein:
  the entry in the current version of the configuration file and the corresponding entry in the updated version of the configuration file, define conflicting enabled/disabled statuses of a feature of the agent; and
  the rule indicates whether to use, in the merged version of the configuration file, the enabled/disabled status of the entry in the current version of the configuration file or the enabled/disabled status of the corresponding entry in the updated version of the configuration file.

21. The memory of claim 17, wherein:
  the entry in the current version of the configuration file and the corresponding entry in the updated version of the configuration file, define conflicting types of communication used by the agent; and
  the rule indicates whether to use, in the merged version of the configuration file, the type of communication of the entry in the current version of the configuration file or the type of communication of the corresponding entry in the updated version of the configuration file.

22. The memory of claim 17, wherein:
  the entry in the current version of the configuration file and the corresponding entry in the updated version of the configuration file, define conflicting locations of a log file of the agent; and
  the rule indicates whether to use, in the merged version of the configuration file, the location of the entry in the current version of the configuration file or the location of the corresponding entry in the updated version of the configuration file.

23. The memory of claim 17, wherein:
the entry in the current version of the configuration file and the corresponding entry in the updated version of the configuration file, define conflicting frequencies with which the agent reports a metric obtained from the application; and
the rule indicates whether to use, in the merged version of the configuration file, the frequency of the entry in the current version of the configuration file or the frequency of the corresponding entry in the updated version of the configuration file.

24. The memory of claim 17, wherein:
the entry in the current version of the configuration file and the corresponding entry in the updated version of the configuration file, define conflicting directives regarding at least one of a method, a class, or a set of classes to instrument and monitor in the application; and
the rule indicates whether to use, in the merged version of the configuration file, the directive of the entry in the current version of the configuration file or the directive of the corresponding entry in the updated version of the configuration file.

25. The memory of claim 17, wherein:
the entry in the current version of the configuration file comprises a key-value pair;
the corresponding entry in the updated version of the configuration file comprises a key-value pair, where the keys are the same and the values are different; and
the rule indicates whether to use, in the merged version of the configuration file, the value of the entry in the current version of the configuration file or the value of the corresponding entry in the updated version of the configuration file.

26. The memory of claim 25, wherein the creating the merged version of the configuration file comprises:
identifying any other entry in the current version of the configuration file and in the updated version of the configuration file which is a line comment and which comprises a key-value pair comprising the key; and
adding the any other entry as a line comment to the merged version of the configuration file.

27. A computer-implemented method, comprising:
accessing a current version of a configuration file and an updated version of the configuration file;
accessing rules in one or more files;
creating and storing a merged version of the configuration file based on the current version of the configuration file, the updated version of the configuration file, and rules; and
using the merged version of the configuration file to control behavior of an agent, including how the agent adds instrumentation to an application and how the agent is configured, the creating the merged version of the configuration file comprises:
  processing entries in the current version of the configuration file; and
  for each entry in the current version of the configuration file: determining whether there is a corresponding entry in the updated version of the configuration file, and if there is the corresponding entry, selecting the entry in the current version of the configuration file or the corresponding entry in the updated version of the configuration file, as a selected entry based on a preference in the rules, adding the selected entry to the merged version of the configuration file, and instrumenting and monitoring the application according to the merged version of the configuration file.

28. The method of claim 27, further comprising:
for each entry in the current version of the configuration file: if there is not the corresponding entry, adding the entry in the current version of the configuration file to the merged version of the configuration file.

29. The method of claim 27, further comprising:
for each entry in the current version of the configuration file, if there is the corresponding entry, identifying the entry in the current version of the configuration file or the corresponding entry in the updated version of the configuration file as an unselected entry; and
regardless of whether the unselected entry is a line comment or a compilable instruction, adding the unselected entry to the merged version of the configuration file as a line comment.

* * * * *